(12) United States Patent
Muntz et al.

(10) Patent No.: US 12,247,609 B2
(45) Date of Patent: Mar. 11, 2025

(54) FASTENER SYSTEMS AND METHODS FOR JOINING MULTIPLE SUBSTRATES OF WORKPIECE

(71) Applicant: The Boeing Company, Arlington, VA (US)

(72) Inventors: Nathan A. Muntz, Everett, WA (US); Farahnaz Sisco, Mukilteo, WA (US); Blake A. Simpson, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/354,821

(22) Filed: Jul. 19, 2023

(65) Prior Publication Data

US 2025/0027527 A1    Jan. 23, 2025

(51) Int. Cl.
*F16B 5/02* (2006.01)
*F16B 19/02* (2006.01)
*F16B 39/28* (2006.01)

(52) U.S. Cl.
CPC ............ *F16B 39/28* (2013.01); *F16B 5/0283* (2013.01); *F16B 5/0258* (2013.01); *F16B 19/02* (2013.01)

(58) Field of Classification Search
CPC .............................. F16B 5/0258; F16B 19/02
USPC ......................................................... 411/69
See application file for complete search history.

(56) References Cited

U.S. PATENT DOCUMENTS

| 3,835,525 | A | * | 9/1974 | King, Jr. | ............... | F16B 37/122 |
| | | | | | | 29/412 |
| 3,892,121 | A | * | 7/1975 | Champoux | ............ | B21D 41/02 |
| | | | | | | 29/243.518 |
| 3,962,843 | A | * | 6/1976 | King, Jr. | ................. | B23P 9/025 |
| | | | | | | 403/243 |
| 4,048,898 | A | | 9/1977 | Salter | | |
| 4,244,661 | A | * | 1/1981 | Dervy | ....................... | F16B 5/01 |
| | | | | | | 403/243 |
| 5,018,920 | A | | 5/1991 | Speakman | | |
| 5,175,665 | A | | 12/1992 | Pegg | | |
| 5,860,778 | A | | 1/1999 | Keener | | |
| 7,204,667 | B2 | * | 4/2007 | Uno | ....................... | F16B 37/06 |
| | | | | | | 411/338 |
| 8,262,331 | B2 | * | 9/2012 | Toosky | ................ | F16B 33/004 |
| | | | | | | 411/57.1 |

(Continued)

OTHER PUBLICATIONS

European Patent Office, Extended European Search Report, App. No. 24178623.5 (Nov. 4, 2024).

*Primary Examiner* — Flemming Saether
(74) *Attorney, Agent, or Firm* — Walters & Wasylyna LLC

(57) ABSTRACT

A fastener system for joining substrates of a workpiece with working and blind sides includes a nut member, a sleeve member and a bolt member. The nut member includes a nut bore with internal threads. The nut member is placed with the nut bore over a joining bore through the substrates on the blind side. The sleeve member includes an outer sleeve surface with a lubricious coating. The sleeve member is inserted in the joining bore from the working side. The bolt member includes a head portion, a threaded portion and a shank portion. The bolt member is inserted in a central bore of the sleeve member. The threaded portion engages with the internal threads of the nut member. As the bolt member becomes fully engaged, the shank portion causes radial expansion of the sleeve member, and the sleeve member provides an interference fit within the joining bore.

20 Claims, 19 Drawing Sheets

(56) References Cited

U.S. PATENT DOCUMENTS

| | | | | |
|---|---|---|---|---|
| 8,322,958 B2* | 12/2012 | Haylock | ................ | F16B 19/02 |
| | | | | 411/339 |
| 8,475,102 B2* | 7/2013 | Haylock | ................ | B64D 45/02 |
| | | | | 411/361 |
| 8,573,910 B2* | 11/2013 | March | ................ | F16B 19/05 |
| | | | | 411/361 |
| 9,644,657 B2* | 5/2017 | Pham | ................ | F16B 19/02 |
| 9,759,246 B2* | 9/2017 | Haylock | ................ | B64D 45/02 |
| 9,915,280 B2* | 3/2018 | Hagan | ................ | F16B 19/1081 |
| 11,300,147 B2* | 4/2022 | Hartnett | ................ | F16B 19/02 |
| 2017/0146045 A1 | 5/2017 | Bickford et al. | | |
| 2018/0193900 A1 | 7/2018 | Gunther et al. | | |
| 2019/0063485 A1 | 2/2019 | Khosravani et al. | | |
| 2019/0301513 A1 | 10/2019 | Morden et al. | | |
| 2019/0301518 A1 | 10/2019 | Morden et al. | | |
| 2019/0383319 A1 | 12/2019 | Simpson et al. | | |
| 2020/0291979 A1 | 9/2020 | Cowles, Jr. et al. | | |
| 2020/0309173 A1 | 10/2020 | Simpson et al. | | |
| 2021/0180636 A1 | 6/2021 | Hansen et al. | | |
| 2021/0210873 A1 | 7/2021 | Hansen et al. | | |
| 2022/0316518 A1 | 10/2022 | Ross et al. | | |

* cited by examiner

FASTENER SYSTEMS AND METHODS FOR JOINING MULTIPLE SUBSTRATES OF WORKPIECE

FIELD

The present disclosure relates generally to fastener systems for joining multiple substrates of a workpiece and, particularly, to fastener systems that provide an interference fit with a workpiece that includes one or more composite substrate. Conductive properties of the various fastener systems provide protection from electromagnetic effects. Various configurations of the fastener systems provide a pre-installed nut member on a blind side of the workpiece and a bolt member for one-sided installation from a working side.

BACKGROUND

Current fastener systems require two-sided installation to obtain an interference fit between the fastener and the workpiece stack up. Conversely, existing fastener systems designed for one-sided installation only provide a clearance fit between the fastener and the stack up.

Accordingly, those skilled in the art continue with research and development efforts to improve fastener systems for joining multiple substrates of a workpiece.

SUMMARY

Disclosed are examples of fastener systems and methods for joining multiple substrates of a workpiece. The following is a non-exhaustive list of examples, which may or may not be claimed, of the subject matter according to the present disclosure.

In an example, a fastener system for joining multiple substrates of a workpiece is disclosed. The workpiece has a working side and a blind side. The fastener system includes a nut member, a sleeve member and a bolt member. The nut member includes a nut bore with internal threads. The nut member configured for placement of the nut bore over a joining bore through the multiple substrates on the blind side of the workpiece. The sleeve member includes an outer sleeve surface with a lubricious coating. The sleeve member configured for insertion in the joining bore through the multiple substrates from the working side of the workpiece. The bolt member includes a head portion, a threaded portion and a shank portion extending between the head portion and the threaded portion. The bolt member is configured for insertion in a central bore of the sleeve member. The threaded portion is configured for threaded engagement with the internal threads of the nut member. As the bolt member becomes fully engaged with the nut member, the shank portion of the bolt member is configured to cause radial expansion of the sleeve member and the sleeve member is configured to provide an interference fit within the joining bore through the multiple substrates.

In an example, a method for joining multiple substrates of a workpiece is disclosed. The workpiece has a working side and a blind side. The method includes: (1) securing a nut member over a joining bore through the multiple substrates on the blind side of the workpiece, the nut member including a nut bore with internal threads; (2) inserting a sleeve member in the joining bore through the multiple substrates from the working side of the workpiece, the sleeve member including an outer sleeve surface with a lubricious coating; (3) inserting a bolt member in a central bore of the sleeve member until a distal end of the bolt member contacts the nut member, the bolt member including a head portion at a proximal end, a threaded portion at the distal end and a shank portion extending between the head portion and the threaded portion; (4) rotating the bolt member to engage the threaded portion with the internal threads of the nut member; (5) radially expanding the sleeve member within the joining bore through the multiple substrates as the bolt member becomes fully engaged with the nut member; and (6) providing an interference fit for the sleeve member within the joining bore through the multiple substrates in response to radial expansion of the sleeve member as the bolt member becomes fully engaged with the nut member.

In an example, another fastener system for joining multiple substrates of a workpiece is disclosed. The workpiece has a working side and a blind side. The fastener system includes a nut member and a bolt member. The nut member includes a nut bore with internal threads. The nut member configured for placement over a joining bore through the multiple substrates on the blind side of the workpiece. The joining bore being tapered from a larger joining bore diameter proximate the working side of the workpiece to a smaller joining bore diameter proximate the blind side of the workpiece such that the joining bore includes a frustoconical joining bore. The bolt member includes a head portion, a threaded portion and a shank portion extending between the head portion and the threaded portion. The shank portion includes an elongated shank body with an outer shank surface. The elongated shank body being tapered from a larger outer shank diameter proximate the head portion to a smaller outer shank diameter proximate the threaded portion such that the elongated shank body includes a frustoconical shank body. The outer shank surface is coated with a lubricious coating. The bolt member configured for insertion in the frustoconical joining bore through the multiple substrates from the working side of the workpiece and configured for threaded engagement with the internal threads of the nut member. As the bolt member becomes fully engaged with the nut member, the frustoconical shank body is configured to provide an interference fit within the frustoconical joining bore through the multiple substrates in conjunction with a corresponding frustoconical shape of the frustoconical joining bore.

In an example, another method for joining multiple substrates of a workpiece is disclosed. The workpiece has a working side and a blind side. The method includes: (1) securing a nut member over a joining bore through the multiple substrates on the blind side of the workpiece, the nut member includes a nut bore with internal threads, the joining bore being tapered from a larger joining bore diameter proximate the working side of the workpiece to a smaller joining bore diameter proximate the blind side of the workpiece such that the joining bore includes a frustoconical joining bore; (2) inserting a bolt member in the frustoconical joining bore through the multiple substrates from the working side of the workpiece until a distal end of the bolt member contacts the nut member, the bolt member includes a head portion at a proximal end, a threaded portion at the distal end and a shank portion extending between the head portion and the threaded portion, the shank portion being tapered from a larger outer shank diameter proximate the head portion to a smaller outer shank diameter proximate the threaded portion such that the shank portion includes a frustoconical shank body, the shank portion includes an outer shank surface with a lubricious coating; (3) rotating the bolt member to engage the threaded portion with the internal threads of the nut member; and (4) providing an interference fit for the shank portion of the bolt member within the frustoconical joining bore through the multiple substrates as the bolt member becomes fully engaged with the nut member in conjunction with a corresponding frustoconical shape of the frustoconical joining bore.

Other examples of the disclosed fastener systems and methods for joining multiple substrates of a workpiece will become apparent from the following detailed description, the accompanying drawings and the appended claims.

DETAILED DESCRIPTION

The various examples of fastener systems and methods for joining multiple substrates of a workpiece disclosed herein provide techniques for pre-installing a nut member of the fastener system on a blind side of the workpiece and one-sided installation of other members of the fastener system from a working side of the workpiece. The workpiece, for example, may include one or more composite material substrates and may be used for aerospace construction.

Figure 1:
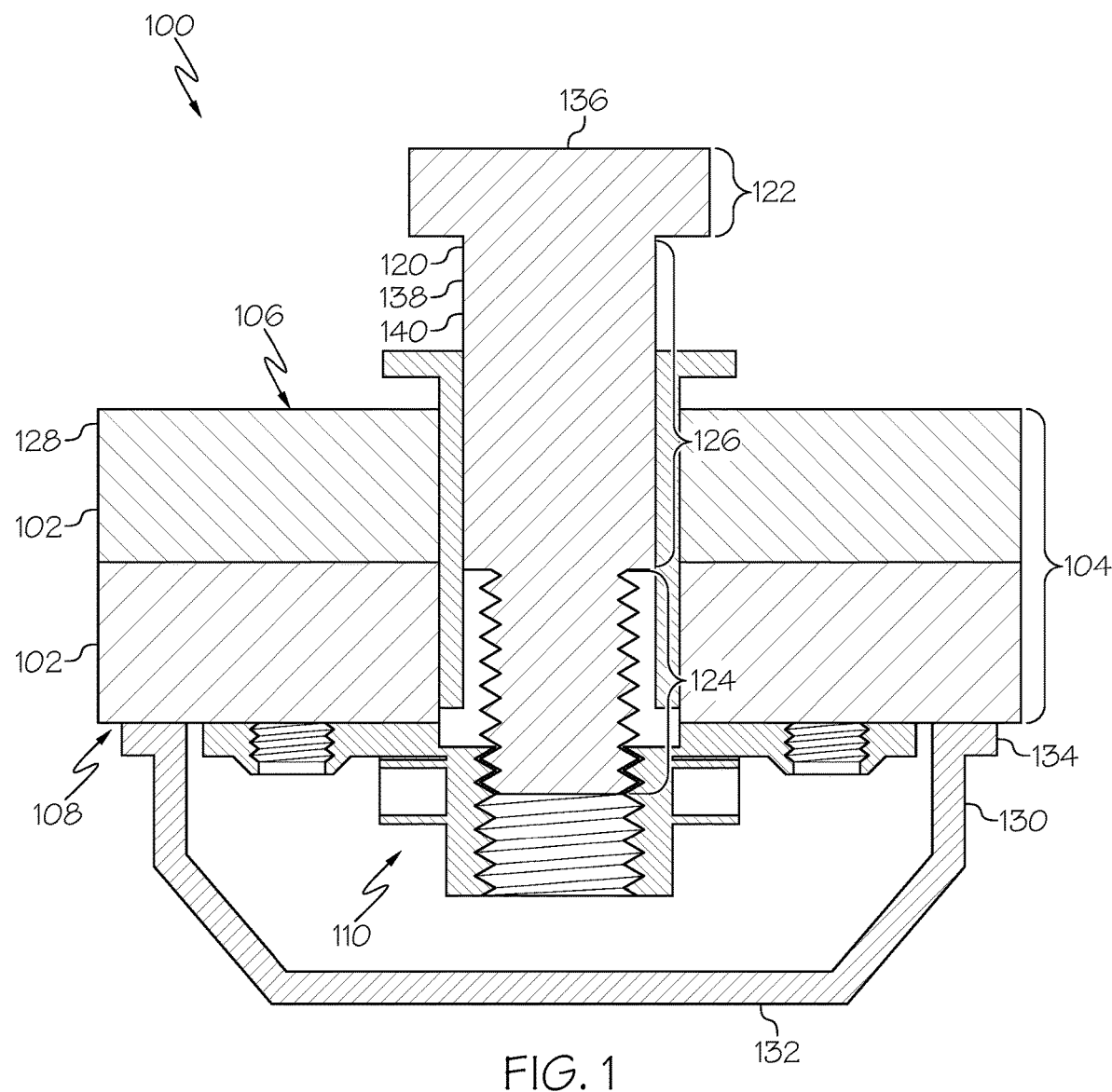
FIG. 1 is a cross-sectional side view of an example of a partially installed fastener system for joining multiple substrates of a workpiece.
Figure 2B:
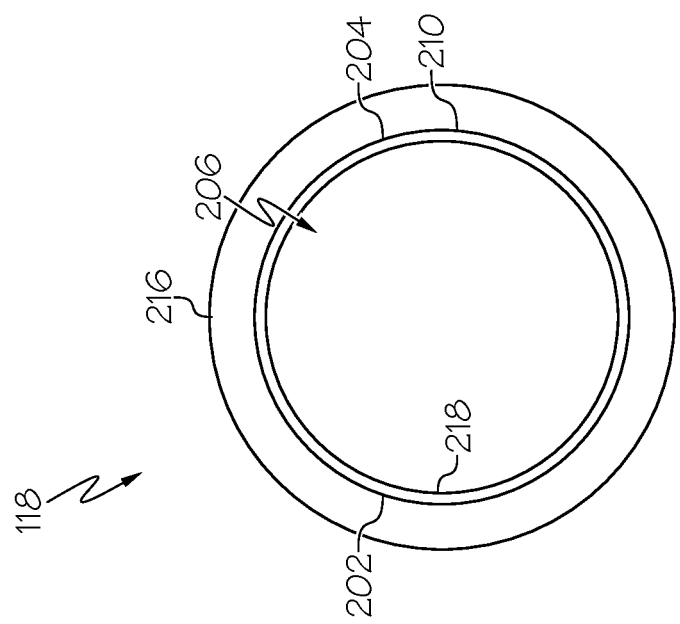
FIG. 2B is a distal end view of the sleeve member of FIG. 2A.
Figure 2A:
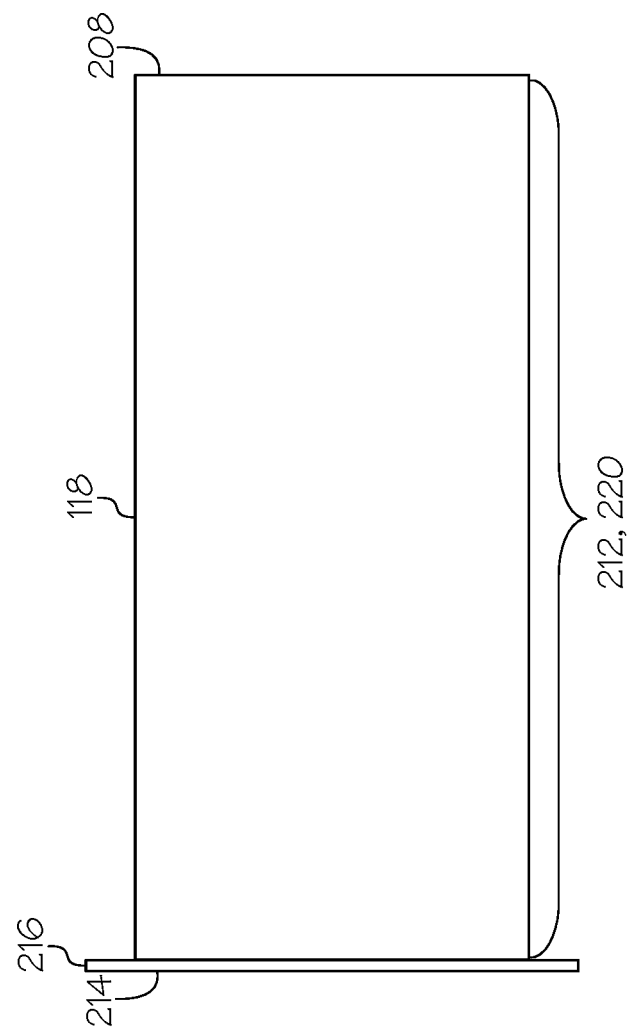
FIG. 2A is a side view of an example of a sleeve member of the fastener system of FIG. 1.
Figure 3:
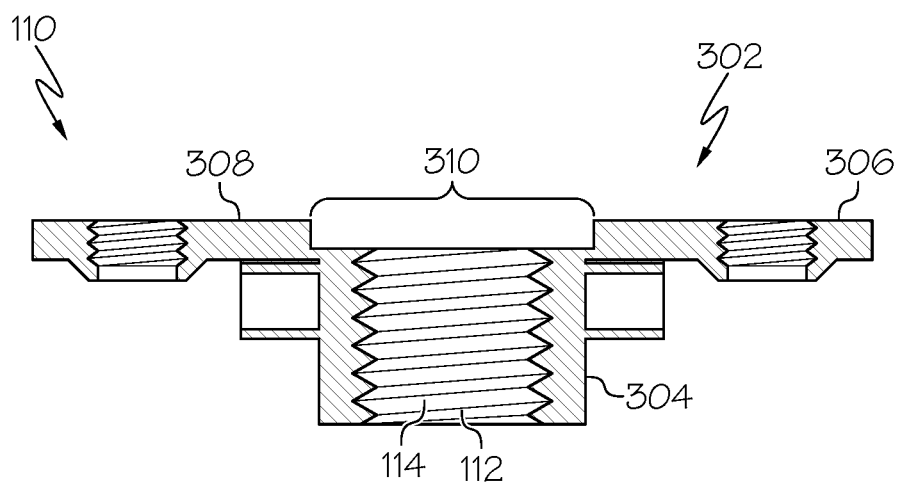
FIG. 3 is a cross-sectional side view of an example of a nut member of the fastener system of FIG. 1.
Figure 4A:
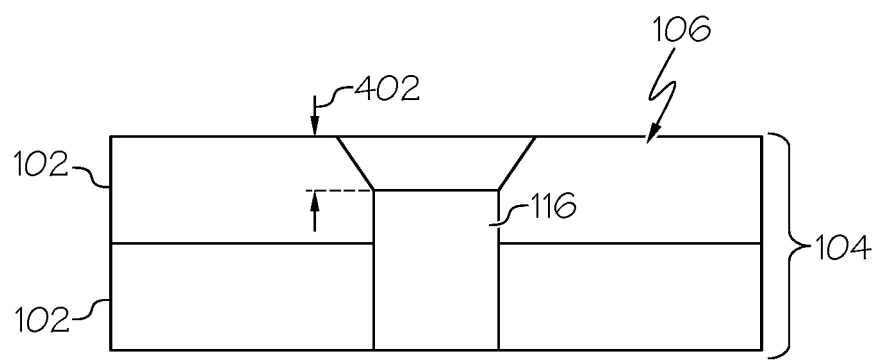
FIGS. 4A-C are cross-sectional side views of examples of countersunk, counterbored and cylindrical joining bores in workpieces having multiple substrates.
Figure 4B:
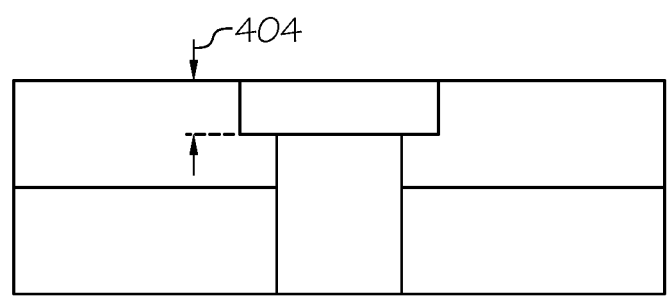
Figure 4C:
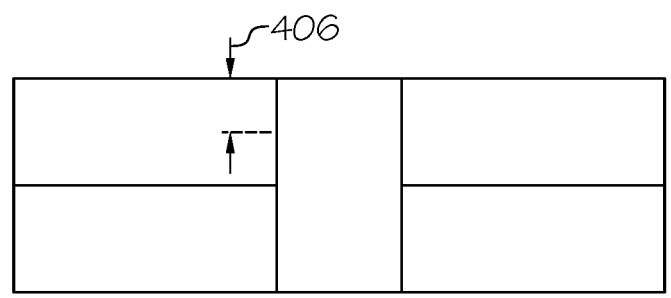
Figure 5:
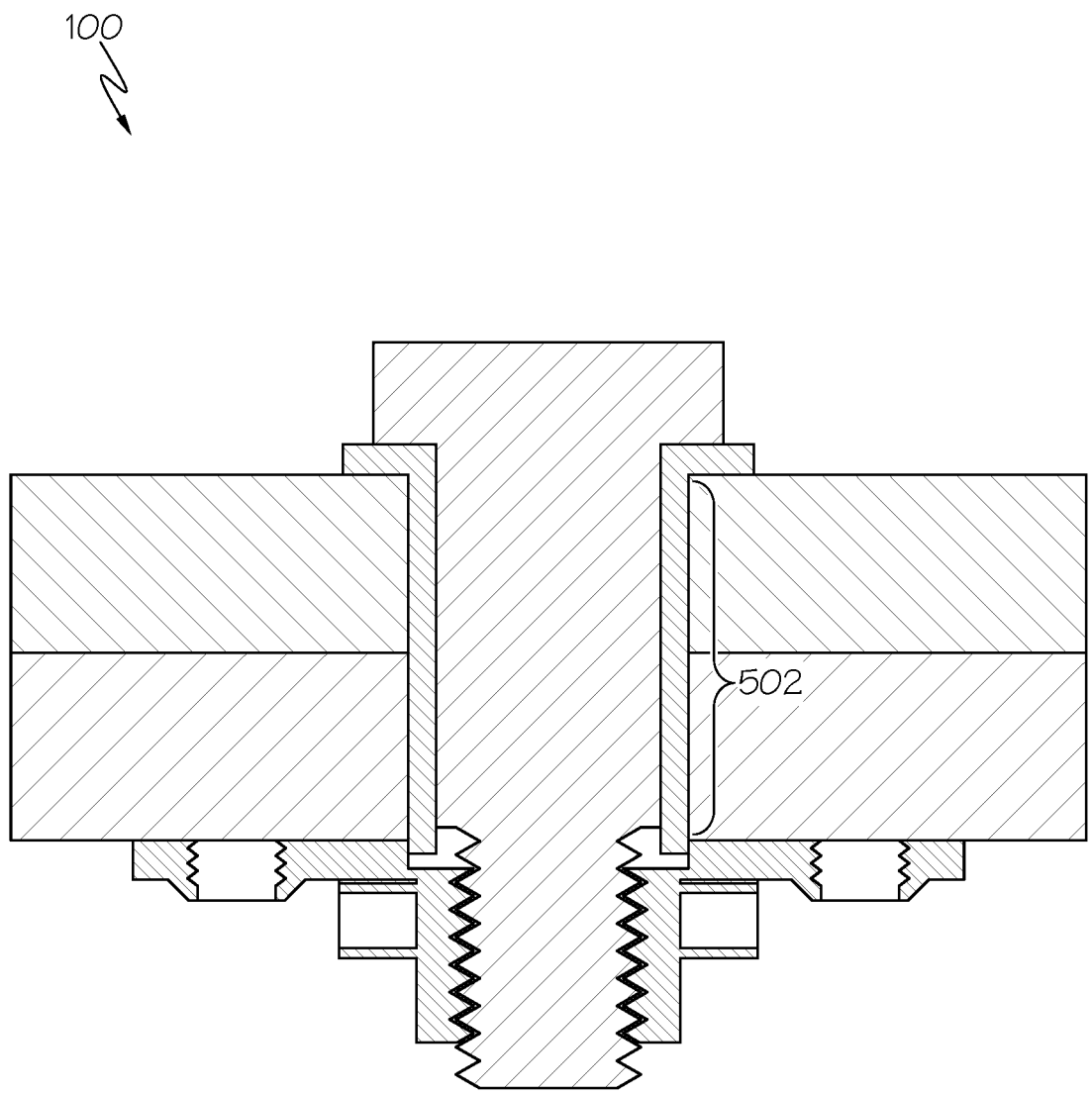
FIG. 5 is a cross-sectional side view of the fastener system of FIG. 1 in which the fastener system is fully installed.
Figure 6:
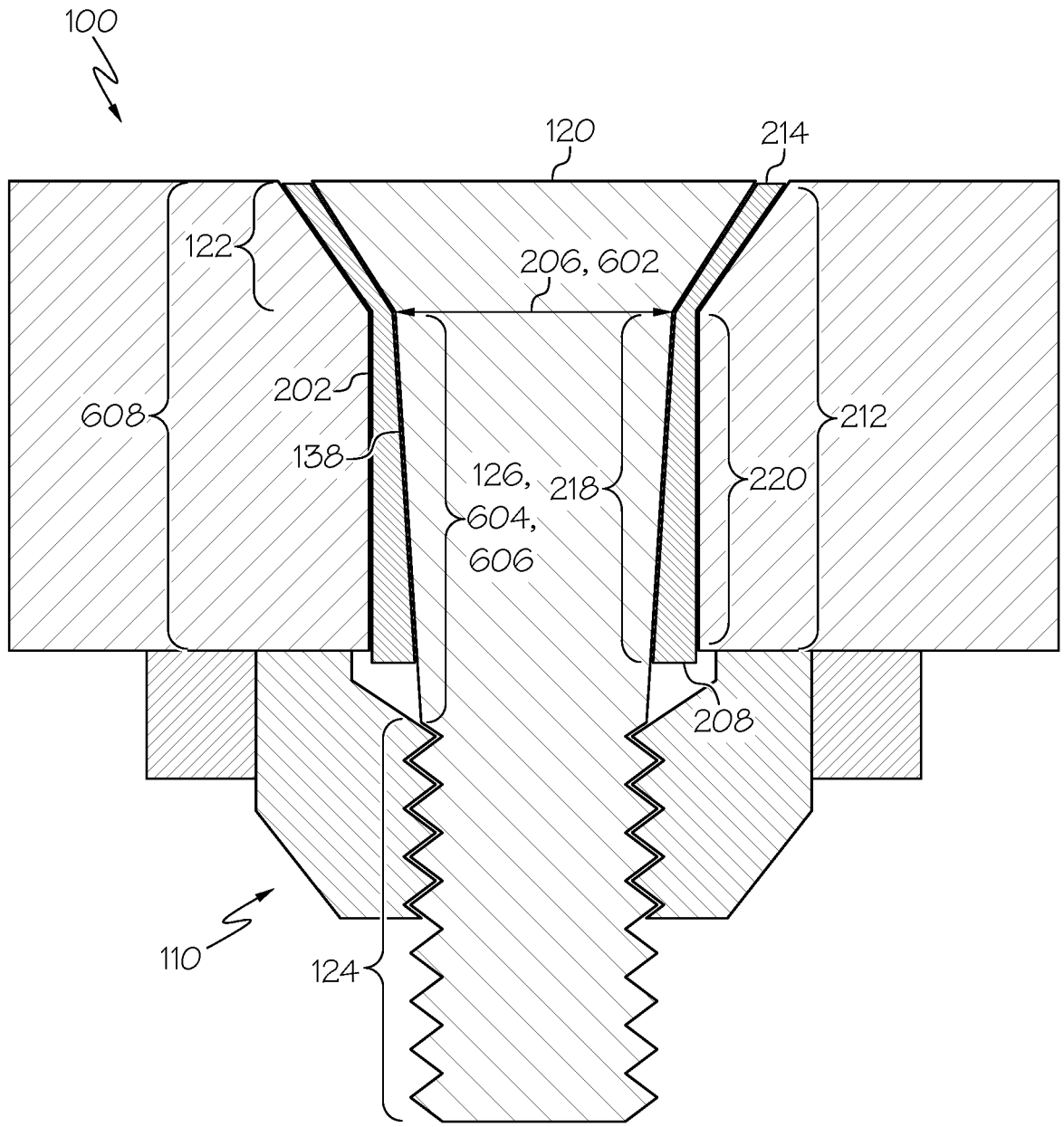
FIG. 6 is a cross-sectional side view of another example of a fastener system for joining multiple substrates of a workpiece.
Figure 7:
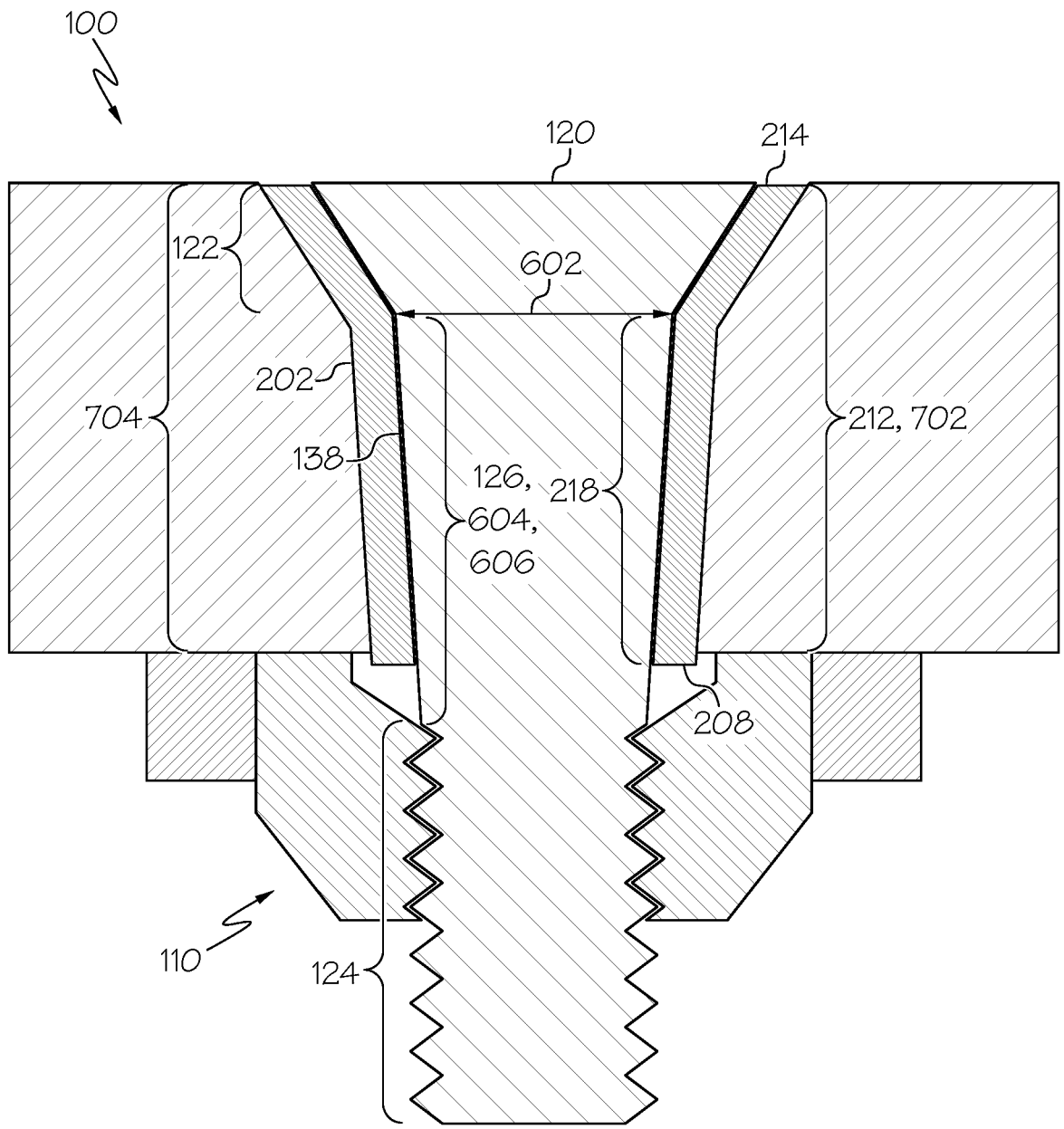
FIG. 7 is a cross-sectional side view of yet another example of a fastener system for joining multiple substrates of a workpiece.

Referring generally to FIGS. 1, 2A-B, 3, 4A-C and 5-7, by way of examples, the present disclosure is directed to a fastener system 100 for joining multiple substrates 102 of a workpiece 104. The workpiece 104 has a working side 106 and a blind side 108. FIGS. 1 and 5-7 disclose examples of the fastener system 100. FIG. 2A shows a side view of an example of a sleeve member 118 of the fastener system 100. FIG. 2B shows a distal end view of the sleeve member of FIG. 2A. FIG. 3 shows an example of a nut member 110 of the fastener system 100. FIGS. 4A-C show examples of joining bores 116 in the workpiece 104 of FIG. 1 with a countersunk portion 402, a counterbored portion 404 and a cylindrical portion 406.

With reference again to 1, 2A-B, 3, 4A-C and 5-7, in one or more examples, a fastener system 100 for joining multiple substrates 102 of a workpiece 104 includes a nut member 110, a sleeve member 118 and a bolt member 120. The workpiece 104 has a working side 106 and a blind side 108. The nut member 110 includes a nut bore 112 with internal threads 114. The nut member 110 configured for placement of the nut bore 112 over a joining bore 116 through the multiple substrates 102 on the blind side 108 of the workpiece 104. The sleeve member 118 includes an outer sleeve surface 202 with a lubricious coating 204. The sleeve member 118 configured for insertion in the joining bore 116 through the multiple substrates 102 from the working side 106 of the workpiece 104. The bolt member 120 includes a head portion 122, a threaded portion 124 and a shank portion 126 extending between the head portion 122 and the threaded portion 124. The bolt member 120 configured for insertion in a central bore 206 of the sleeve member 118. The threaded portion 124 configured for threaded engagement with the internal threads 114 of the nut member 110. As the bolt member 120 becomes fully engaged with the nut member 110, the shank portion 126 of the bolt member 120 is configured to cause radial expansion of the sleeve member 118 and the sleeve member 118 is configured to provide an interference fit 502 within the joining bore 116 through the multiple substrates 102.

In another example of the fastener system 100, the multiple substrates 102 include at least one composite material substrate 128. In yet another example of the fastener system 100, the nut member 110 is configured to be secured to the blind side 108 of the workpiece 104. In a further example, the nut member 110 is configured to be secured to the blind side 108 of the workpiece 104 using mechanical fasteners, swagging or any other suitable fastening hardware/technique in any suitable combination.

In still another example of the fastener system 100, the nut member 110 includes a nut plate assembly 302 with a nut 304 and a flange plate 306 captively retaining the nut 304. The nut 304 includes the nut bore 112. The flange plate 306 configured to be secured to the blind side 108 of the workpiece 104 with the nut bore 112 over the joining bore 116 through the multiple substrates 102. In a further example, the nut 304 captively retained by the flange plate 306 is spaced from a mounting surface 308 of the flange plate 306. In this example, the flange plate 306 includes a counterbore 310 into the mounting surface 308 in relative alignment with the nut bore 112 of the nut 304 and the joining bore 116 of the multiple substrates 102. The counterbore 310 configured to provide space for a distal end 208 of the sleeve member 118 protruding from the joining bore 116 at the blind side 108 of the workpiece 104 as the bolt member 120 becomes fully engaged with the nut member 110.

In still yet another example, the fastener system 100 also includes a cap sealant member 130 with a dome 132 and a cap flange 134. The cap sealant member 130 configured for placement over the nut member 110. The cap flange 134 configured to secure the cap sealant member 130 to the blind side 108 of the workpiece 104.

In another example of the fastener system 100, the sleeve member 118 includes a malleable metallic material. In a further example, the malleable metallic material includes tin, a tin alloy, copper, a copper alloy, aluminum, an aluminum alloy, silver, a silver alloy, gold, a gold alloy or any other suitable malleable metallic in any suitable combination.

In yet another example of the fastener system 100, the lubricious coating 204 includes indium, an indium alloy, tin, a tin alloy, bismuth, a bismuth alloy, aluminum, an aluminum alloy or any other suitable lubricious coating in any suitable combination. In still another example of the fastener system 100, the lubricious coating 204 on the outer sleeve surface 202 includes conductive features configured to provide electromagnetic energy protection to the workpiece 104 as the bolt member 120 becomes fully engaged with the nut member 110. In still yet another example of the fastener system 100, the outer sleeve surface 202 is coated with a conductive coating 210 to provide electromagnetic energy protection to the workpiece 104 as the bolt member 120 becomes fully engaged with the nut member 110. In a further example, the conductive coating 210 includes indium, an indium alloy, tin, a tin alloy, lead, a lead alloy or any other suitable conductive coating in any suitable combination.

In another example of the fastener system 100, the sleeve member 118 also includes an elongated sleeve body 212 and a sleeve flange 216. The elongated sleeve body 212 defining the central bore 206. The elongated sleeve body 212 includes the outer sleeve surface 202, a proximal end 214 relating to the working side 106 of the workpiece 104 and a distal end 208 relating to the blind side 108 of the workpiece 104. The sleeve flange 216 disposed at the proximal end 214 of the elongated sleeve body 212. The sleeve flange 216 configured to limit further insertion of the sleeve member 118 into the joining bore 116 through the multiple substrates 102.

In yet another example of the fastener system 100, the bolt member 120 includes a metallic material. In a further example, the metallic material includes a stainless steel, titanium, a titanium alloy, a cobalt-chromium alloy, a nickel-titanium alloy or any other suitable metallic material in any suitable combination. In still another example of the fastener system 100, the head portion 122 of the bolt member 120 includes a torquing feature 136. In a further example, the torquing feature 136 is configured to facilitate rotation of the bolt member 120 using a hex key torquing tool, a cross-tip driver torquing tool, a flat tip driver torquing tool, a hex socket torquing tool or any other suitable torquing tool. In still yet another example of the fastener system 100, the head portion 122 of the bolt member 120 includes a protruding head, a flush head, a countersunk head, a raised head, a recessed hexagon socket head, a recessed cross-tip head, a recessed flat tip head, a hexagon head or any other suitable type of head. In another example of the fastener system 100, at the working side 106 of the workpiece 104, the joining bore 116 through the multiple substrates 102 includes a countersunk portion 402, a counterbored portion 404, a cylindrical portion 406 or any other suitable geometry at the working side 106 compatible with the head portion 122 of the bolt member 120.

In yet another example of the fastener system 100, the sleeve member 118 also includes an inner sleeve surface 218 and the shank portion 126 of the bolt member 120 includes an outer shank surface 138. In this example, at least one of the inner sleeve surface 218 and the outer shank surface 138 is coated with the lubricious coating 204.

In still another example of the fastener system 100, an outer shank diameter for the shank portion 126 of the bolt member 120 is substantially greater than an inner sleeve diameter for the sleeve member 118. In a further example, the outer shank diameter is substantially greater than the inner sleeve diameter by approximately 0.0005 inches, approximately 0.0010 inches, approximately 0.0015 inches, approximately 0.0020 inches, approximately 0.0025 inches or any other suitable difference measurement resulting in substantial expansion of the sleeve member 118. In another further example, the outer shank diameter is substantially greater than the inner sleeve diameter by approximately 0.2 percent, approximately 0.4 percent, approximately 0.6 percent, approximately 0.8 percent, approximately 1.0 percent or any other suitable percentage resulting in substantial expansion of the sleeve member 118.

In still yet another example of the fastener system 100, the sleeve member 118 also includes a cylindrical sleeve body 220 defining the central bore 206. The cylindrical sleeve body 220 includes the outer sleeve surface 202, an inner sleeve surface 218 facing the central bore 206, a proximal end 214 relating to the working side 106 of the workpiece 104 and a distal end 208 relating to the blind side 108 of the workpiece 104. In a further example, the shank portion 126 of the bolt member 120 includes a cylindrical shank body 140. The cylindrical shank body 140 includes an outer shank surface 138 configured to face the inner sleeve surface 218 of the cylindrical sleeve body 220 as the bolt member 120 is inserted into the central bore 206 and becomes engaged with the nut member 110.

In an even further example, an outer shank diameter for the cylindrical shank body 140 is substantially greater than an inner sleeve diameter for the cylindrical sleeve body 220.

In an even yet further example, the outer shank diameter is substantially greater than the inner sleeve diameter by approximately 0.0005 inches, approximately 0.0010 inches, approximately 0.0015 inches, approximately 0.0020 inches, approximately 0.0025 inches or any other suitable difference measurement resulting in substantial expansion of the sleeve member 118. In another even further example, the outer shank diameter is substantially greater than the inner sleeve diameter by approximately 0.2 percent, approximately 0.4 percent, approximately 0.6 percent, approximately 0.8 percent, approximately 1.0 percent or any other suitable percentage resulting in substantial expansion of the sleeve member 118.

In another even further example, as the bolt member 120 becomes fully engaged with the nut member 110, the outer sleeve surface 202 is configured to provide the interference fit 502 within the joining bore 116 through the multiple substrates 102 in conjunction with a corresponding cylindrical shape of the joining bore 116.

In another example of the fastener system 100, the sleeve member 118 also includes an elongated sleeve body 212 defining the central bore 206. The elongated sleeve body 212 includes the outer sleeve surface 202, an inner sleeve surface 218 facing the central bore 206, a proximal end 214 relating to the working side 106 of the workpiece 104 and a distal end 208 relating to the blind side 108 of the workpiece 104. In this example, at least the inner sleeve surface 218 is tapered from a larger inner sleeve diameter proximate the proximal end 214 to a smaller inner sleeve diameter proximate the distal end 208 such that the central bore 206 includes a frustoconical sleeve bore 602.

In a further example, the outer sleeve surface 202 is cylindrical such that the elongated sleeve body 212 includes a cylindrical sleeve body 220 with the frustoconical sleeve bore 602. In an even further example, the shank portion 126 of the bolt member 120 includes an elongated shank body 604 with an outer shank surface 138 configured to face the inner sleeve surface 218 as the bolt member 120 is inserted into the frustoconical sleeve bore 602 and becomes engaged with the nut member 110. In this example, the elongated shank body 604 is tapered from a larger outer shank diameter proximate the head portion 122 of the bolt member 120 to a smaller outer shank diameter proximate the threaded portion 124 of the bolt member 120 such that the elongated shank body 604 includes a frustoconical shank body 606.

In an even yet further example, outer shank diameters for the frustoconical shank body 606 are substantially greater than corresponding inner sleeve diameters that define the frustoconical sleeve bore 602. In an even still further example, the outer shank diameters are substantially greater than the corresponding inner sleeve diameters by approximately 0.0005 inches, approximately 0.0010 inches, approximately 0.0015 inches, approximately 0.0020 inches, approximately 0.0025 inches or any other suitable difference measurement resulting in substantial expansion of the sleeve member 118. In another even still further example, the outer shank diameters are substantially greater than the corresponding inner sleeve diameters by at least one of approximately 0.2 percent, approximately 0.4 percent, approximately 0.6 percent, approximately 0.8 percent, approximately 1.0 percent or any other suitable percentage resulting in substantial expansion of the sleeve member 118.

In another even yet further example, as the bolt member 120 becomes fully engaged with the nut member 110, the outer sleeve surface 202 is configured to provide the interference fit 608 within the joining bore 116 through the multiple substrates 102 in conjunction with a corresponding cylindrical shape of the joining bore 116.

In another further example, the outer sleeve surface 202 is tapered from a larger outer sleeve diameter proximate the proximal end 214 to a smaller outer sleeve diameter proximate the distal end 208 such that the elongated sleeve body 212 includes a frustoconical sleeve body 702. In an even further example, the shank portion 126 of the bolt member 120 includes an elongated shank body 604 with an outer shank surface 138 configured to face the inner sleeve surface 218 as the bolt member 120 is inserted into the frustoconical sleeve bore 602 and becomes engaged with the nut member 110. In this example, the elongated shank body 604 is tapered from a larger outer shank diameter proximate the head portion 122 of the bolt member 120 to a smaller outer shank diameter proximate the threaded portion 124 of the bolt member 120 such that the elongated shank body 604 includes a frustoconical shank body 606.

In an even yet further example, outer shank diameters for the frustoconical shank body 606 are substantially greater than corresponding inner sleeve diameters that define the frustoconical sleeve bore 602. In an even still further example, the outer shank diameters are substantially greater than the corresponding inner sleeve diameters by approximately 0.0005 inches, approximately 0.0010 inches, approximately 0.0015 inches, approximately 0.0020 inches, approximately 0.0025 inches or any other suitable difference measurement resulting in substantial expansion of the sleeve member 118. In another even still further example, the outer shank diameters are substantially greater than the corresponding inner sleeve diameters by approximately 0.2 percent, approximately 0.4 percent, approximately 0.6 percent, approximately 0.8 percent, approximately 1.0 percent or any other suitable percentage resulting in substantial expansion of the sleeve member 118.

In another even yet further example, as the bolt member 120 becomes fully engaged with the nut member 110, the frustoconical shank body 606 is configured to cause radial expansion of the frustoconical sleeve body 702 in conjunction with the frustoconical sleeve bore 602 of the frustoconical sleeve body 702 and the frustoconical sleeve body 702 is configured to provide the interference fit 704 within the joining bore 116 through the multiple substrates 102 in conjunction with a corresponding frustoconical shape of the joining bore 116.

Figure 8:
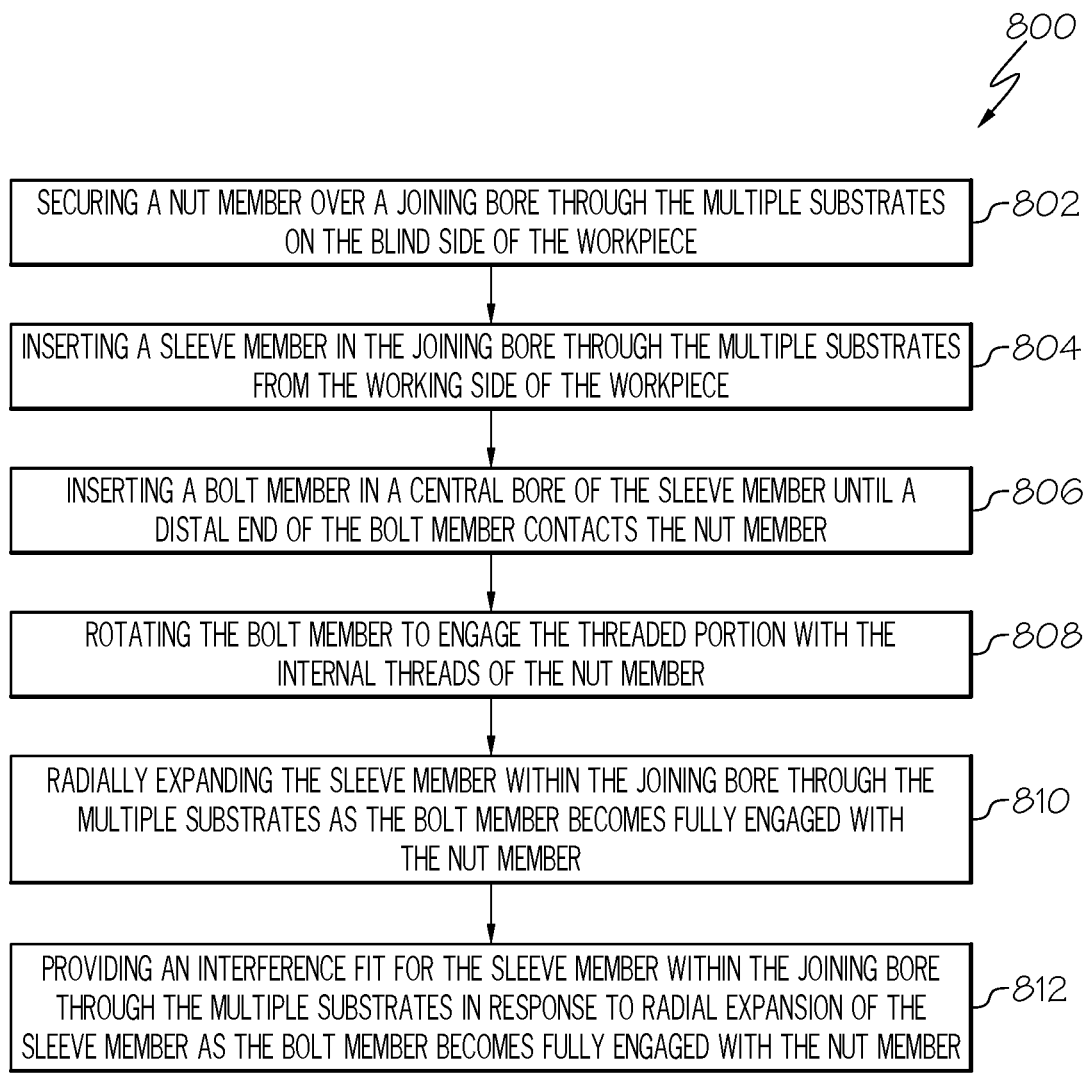
FIG. 8 is a flow diagram of an example of a method for joining multiple substrates of a workpiece.
Figure 9:
FIG. 9 is a flow diagram showing a further example of "securing a nut member" from the method of FIG. 8.
Figure 10:
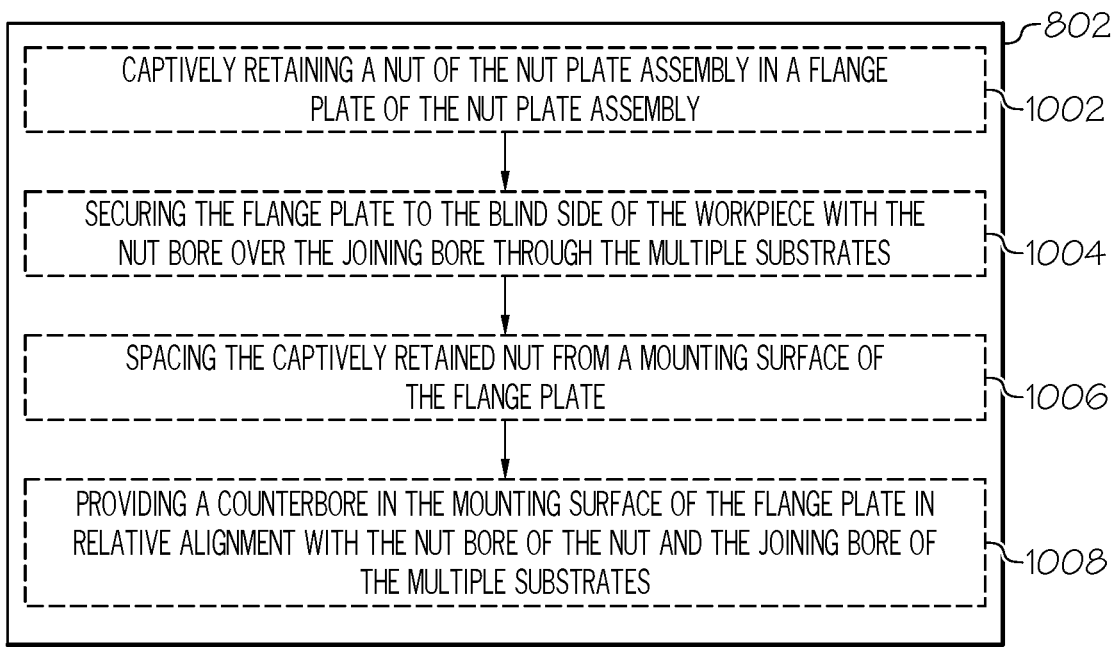
FIG. 10 is a flow diagram showing another further example of "securing a nut member" from the method of FIG. 8.
Figure 11:
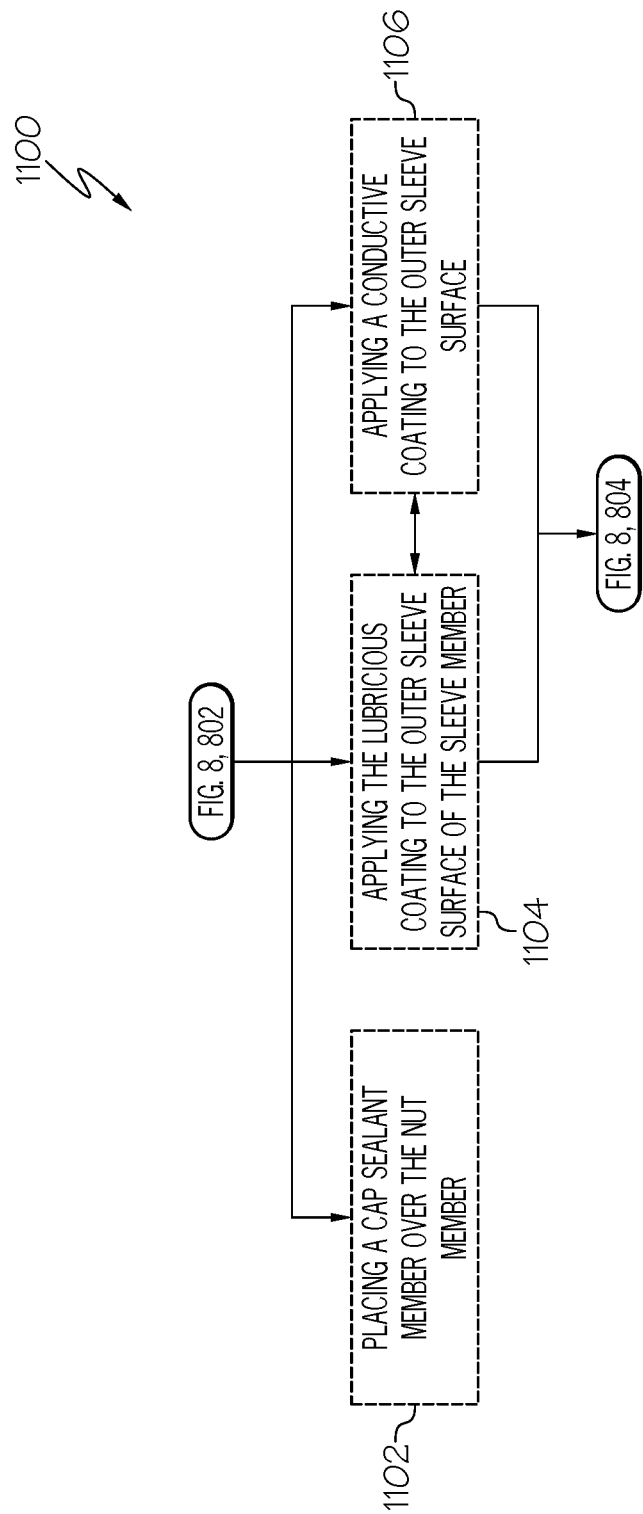
FIG. 11, in combination with FIG. 8, is a flow diagram of another example of a method for joining multiple substrates of a workpiece.
Figure 12:
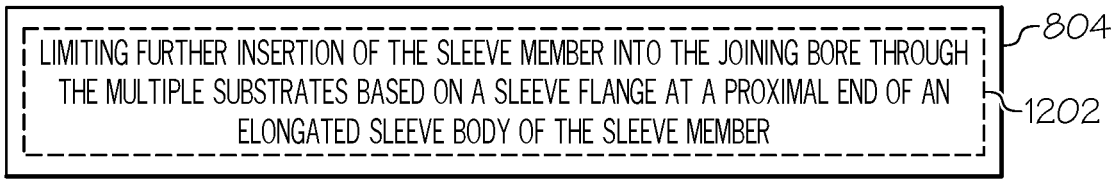
FIG. 12 is a flow diagram showing a further example of "inserting a sleeve member" from the method of FIG. 8.
Figure 13:
FIG. 13 is a flow diagram showing a further example of "rotating the bolt member" from the method of FIG. 8.
Figure 14:
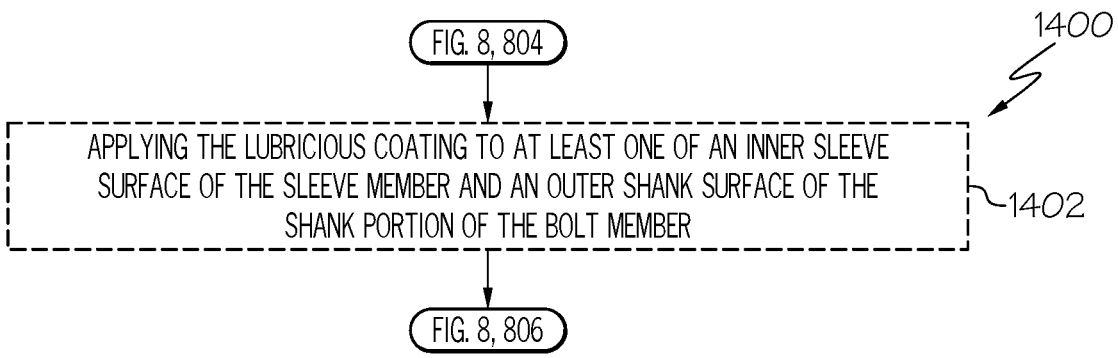
FIG. 14, in combination with FIG. 8, is a flow diagram of yet another example of a method for joining multiple substrates of a workpiece.
Figure 15:
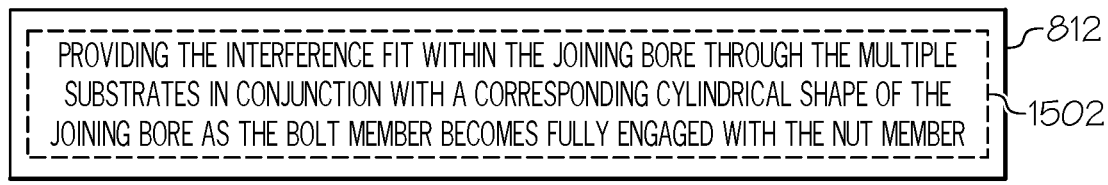
FIG. 15 is a flow diagram showing a further example of "providing an interference fit" from the method of FIG. 8.
Figure 16:
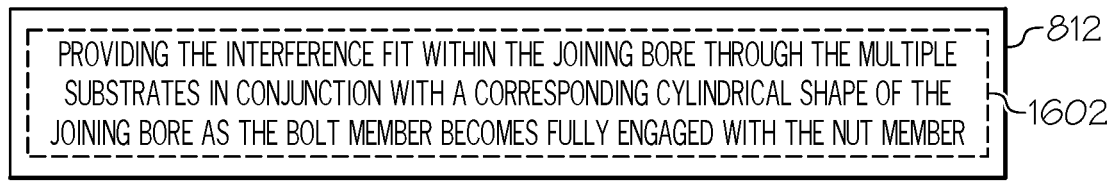
FIG. 16 is a flow diagram showing another further example of "providing an interference fit" from the method of FIG. 8.
Figure 17:
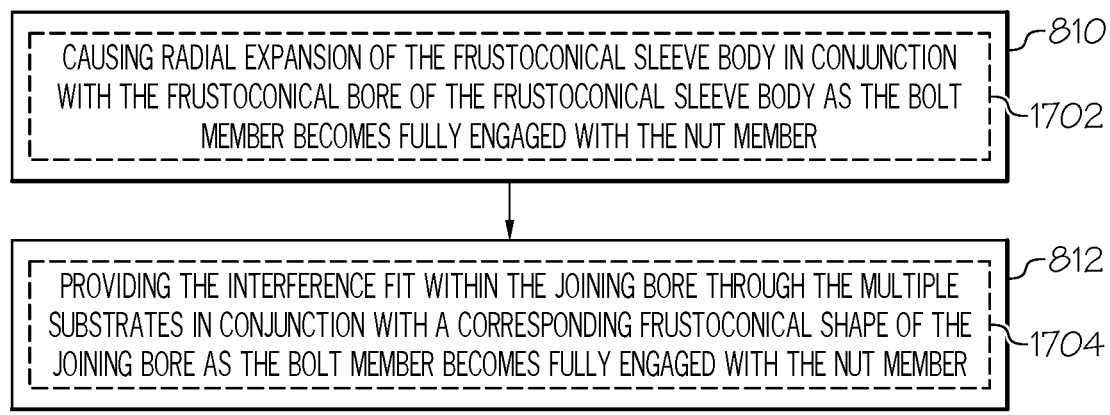
FIG. 17 is a flow diagram showing a further example of "radially expanding" from the method of FIG. 8 and yet another further example of "providing an interference fit" from the method of FIG. 8.

Referring generally to FIGS. 1, 2A-B, 3 and 5-17, by way of examples, the present disclosure is directed to methods 800, 1100, 1400 for joining multiple substrates 102 of a workpiece 104. The workpiece 104 has a working side 106 and a blind side 108. FIGS. 1 and 5-7 disclose examples of the fastener system 100. FIG. 2A shows a side view of an example of a sleeve member 118 of the fastener system 100. FIG. 2B shows a distal end view of the sleeve member of FIG. 2A. FIG. 3 shows an example of a nut member 110 of the fastener system 100. FIGS. 8-10, 12, 13 and 15-17 disclose various examples of the method 800. FIGS. 8 and 11 disclose various examples of the method 1100. FIGS. 8 and 14 disclose various examples of the method 1400.

With reference again to FIGS. 1, 2A-B, 3, 5-10, 12, 13 and 15-17, in one or more examples, a method 800 (see FIG. 8) for joining multiple substrates 102 of a workpiece 104 with a working side 106 and a blind side 108 includes securing 802 a nut member 110 over a joining bore 116 through the multiple substrates 102 on the blind side 108 of the workpiece 104. The nut member 110 includes a nut bore 112 with internal threads 114. At 804, a sleeve member 118 is inserted in the joining bore 116 through the multiple substrates 102 from the working side 106 of the workpiece 104. The sleeve member 118 includes an outer sleeve surface 202 with a lubricious coating 204. At 806, a bolt member 120 is inserted in a central bore 206 of the sleeve member 118 until a distal end of the bolt member 120 contacts the nut member 110. The bolt member 120 includes a head portion 122 at a proximal end, a threaded portion 124 at the distal end and a shank portion (126) extending between the head portion 122 and the threaded portion 124. At 808, the bolt member 120 is rotated to engage the threaded portion 124 with the internal threads 114 of the nut member 110. At 810, the sleeve member 118 is radially expanded within the joining bore 116 through the multiple substrates 102 as the bolt member 120 becomes fully engaged with the nut member 110. At 812, an interference fit 502 is provided for the sleeve member 118 within the joining bore 116 through the multiple substrates 102 in response to radial expansion of the sleeve member 118 as the bolt member 120 becomes fully engaged with the nut member 110.

In another example of the method 800, the securing 802 the nut member 110 includes securing 902 (see FIG. 9) the nut member 110 to the blind side 108 of the workpiece 104 using mechanical fasteners, swagging or any other suitable fastening hardware/technique in any suitable combination.

In yet another example of the method 800, the nut member 110 also includes a nut plate assembly 302. In this example, the securing 802 the nut member 110 includes captively retaining 1002 (see FIG. 10) a nut 304 of the nut plate assembly 302 in a flange plate 306 of the nut plate assembly 302. At 1004, the flange plate 306 is secured to the blind side 108 of the workpiece 104 with the nut bore 112 over the joining bore 116 through the multiple substrates 102. In a further example, the securing 802 the nut member 110 also includes spacing 1006 the nut 304 of the nut plate assembly 302 from a mounting surface 308 of the flange plate 306. At 1008, a counterbore 310 is provided in the mounting surface 308 of the flange plate 306 in relative alignment with the nut bore 112 of the nut 304 and the joining bore 116 of the multiple substrates 102. In this example, the counterbore 310 provides space for a distal end 208 of the sleeve member 118 protruding from the joining bore 116 at the blind side 108 of the workpiece 104 as the bolt member 120 becomes fully engaged with the nut member 110.

With reference again to FIGS. 1, 2A-B, 8 and 11, in one or more examples, a method 1100 (see FIG. 11) for joining multiple substrates 102 of a workpiece 104 includes the method 800 of FIG. 8 and continues from 802 to 1102 where a cap sealant member 130 is placed over the nut member 110. The cap sealant member 130 includes a dome 132 and a cap flange 134. The cap flange 134 configured to secure the cap sealant member 130 to the blind side 108 of the workpiece 104. In another example, the method 1100 includes applying 1104 the lubricious coating 204 to the outer sleeve surface 202 of the sleeve member 118. In this example, the method 1100 continues from 1104 to 802 of FIG. 8. In a further example of the method 1100, the lubricious coating 204 on the outer sleeve surface 202 includes conductive features configured to provide electromagnetic energy protection to the workpiece 104 as the bolt member 120 becomes fully engaged with the nut member 110. In yet another example, the method 1100 includes applying 1106 a conductive coating 210 to the outer sleeve surface 202. In this example, the method 1100 continues from 1106 to 802 of FIG. 8.

With reference again to FIGS. 1, 2A-B, 3, 5-10, 12, 13 and 15-17, in still another example of the method 800, the inserting 804 the sleeve member 118 includes limiting 1202 (see FIG. 12) further insertion of the sleeve member 118 into the joining bore 116 through the multiple substrates 102 based on a sleeve flange 216 at a proximal end 214 of an elongated sleeve body 212 of the sleeve member 118. In still yet another example of the method 800, the rotating 808 the bolt member 120 includes torquing 1302 (see FIG. 13) the bolt member 120 to become fully engaged with the nut member 110.

With reference again to FIGS. 1, 2A-B, 8 and 14, in one or more examples, a method 1400 (see FIG. 14) for joining multiple substrates 102 of a workpiece 104 includes the method 800 of FIG. 8 and continues from 804 to 1402 where the lubricious coating 204 is applied to at least one of an inner sleeve surface 218 of the sleeve member 118 and an outer shank surface 138 of the shank portion 126 of the bolt member 120.

With reference again to FIGS. 1, 2A-B, 3, 5-10, 12, 13 and 15-17, in another example of the method 800, an outer shank diameter for the shank portion (126) of the bolt member (120) is substantially greater than an inner sleeve diameter for the sleeve member (118).

In yet another example of the method 800, the sleeve member 118 also includes a cylindrical sleeve body 220 defining the central bore 206. The cylindrical sleeve body 220 includes the outer sleeve surface 202, an inner sleeve surface 218 facing the central bore 206, a proximal end 214 relating to the working side 106 of the workpiece 104 and a distal end 208 relating to the blind side 108 of the workpiece 104. In a further example, the shank portion 126 of the bolt member 120 includes a cylindrical shank body 140. The cylindrical shank body 140 includes an outer shank surface 138 configured to face the inner sleeve surface 218 of the cylindrical sleeve body 220 as the bolt member 120 is inserted into the central bore 206 and becomes engaged with the nut member 110. In an even further example, an outer shank diameter for the cylindrical shank body 140 is substantially greater than an inner sleeve diameter for the cylindrical sleeve body 220. In another even further example of the method 800, the providing 812 the interference fit 502 includes providing 1502 (see FIG. 15) the interference fit 502 within the joining bore 116 through the multiple substrates 102 in conjunction with a corresponding cylindrical shape of the joining bore 116 as the bolt member 120 becomes fully engaged with the nut member 110.

In still another example of the method 800, the sleeve member 118 also includes an elongated sleeve body 212 defining the central bore 206. The elongated sleeve body 212 includes the outer sleeve surface 202, an inner sleeve surface 218 facing the central bore 206, a proximal end 214 relating to the working side 106 of the workpiece 104 and a distal end 208 relating to the blind side 108 of the workpiece 104. In this example, at least the inner sleeve surface 218 is tapered from a larger inner sleeve diameter proximate the proximal end 214 to a smaller inner sleeve diameter proximate the distal end 208 such that the central bore 206 includes a frustoconical sleeve bore 602.

In a further example, the outer sleeve surface 202 is cylindrical such that the elongated sleeve body 212 includes a cylindrical sleeve body 220 with the frustoconical sleeve bore 602. In an even further example, the shank portion 126 of the bolt member 120 includes an elongated shank body 604 with an outer shank surface 138 configured to face the inner sleeve surface 218 as the bolt member 120 is inserted into the frustoconical sleeve bore 602 and becomes engaged with the nut member 110. In this example, the elongated shank body 604 is tapered from a larger outer shank diameter proximate the head portion 122 of the bolt member 120 to a smaller outer shank diameter proximate the threaded portion 124 of the bolt member 120 such that the elongated shank body 604 includes a frustoconical shank body 606. In an even yet further example, outer shank diameters for the frustoconical shank body 606 are substantially greater than corresponding inner sleeve diameters that define the frustoconical sleeve bore 602. In another even yet further example of the method 800, the providing 812 the interference fit 502 includes providing 1602 (see FIG. 16) the interference fit 608 within the joining bore 116 through the multiple substrates 102 in conjunction with a corresponding cylindrical shape of the joining bore 116 as the bolt member 120 becomes fully engaged with the nut member 110.

In another further example, the outer sleeve surface 202 is tapered from a larger outer sleeve diameter proximate the proximal end 214 to a smaller outer sleeve diameter proximate the distal end 208 such that the elongated sleeve body 212 includes a frustoconical sleeve body 702. In an even further example, the shank portion 126 of the bolt member 120 includes an elongated shank body 604 with an outer shank surface 138 configured to face the inner sleeve surface 218 as the bolt member 120 is inserted into the frustoconical sleeve bore 602 and becomes engaged with the nut member 110. In this example, the elongated shank body 604 is tapered from a larger outer shank diameter proximate the head portion 122 of the bolt member 120 to a smaller outer shank diameter proximate the threaded portion 124 of the bolt member 120 such that the elongated shank body 604 includes a frustoconical shank body 606. In an even yet further example, outer shank diameters for the frustoconical shank body 606 are substantially greater than corresponding inner sleeve diameters that define the frustoconical sleeve bore 602. In another even yet further example of the method 800, the radially expanding 810 includes causing 1702 (see FIG. 17) radial expansion of the frustoconical sleeve body 702 in conjunction with the frustoconical sleeve bore 602 of the frustoconical sleeve body 702 as the bolt member 120 becomes fully engaged with the nut member 110. In this example, the providing 812 the interference fit 502 includes providing 1704 the interference fit 704 within the joining bore 116 through the multiple substrates 102 in conjunction with a corresponding frustoconical shape of the joining bore 116 as the bolt member 120 becomes fully engaged with the nut member 110.

Figure 18:
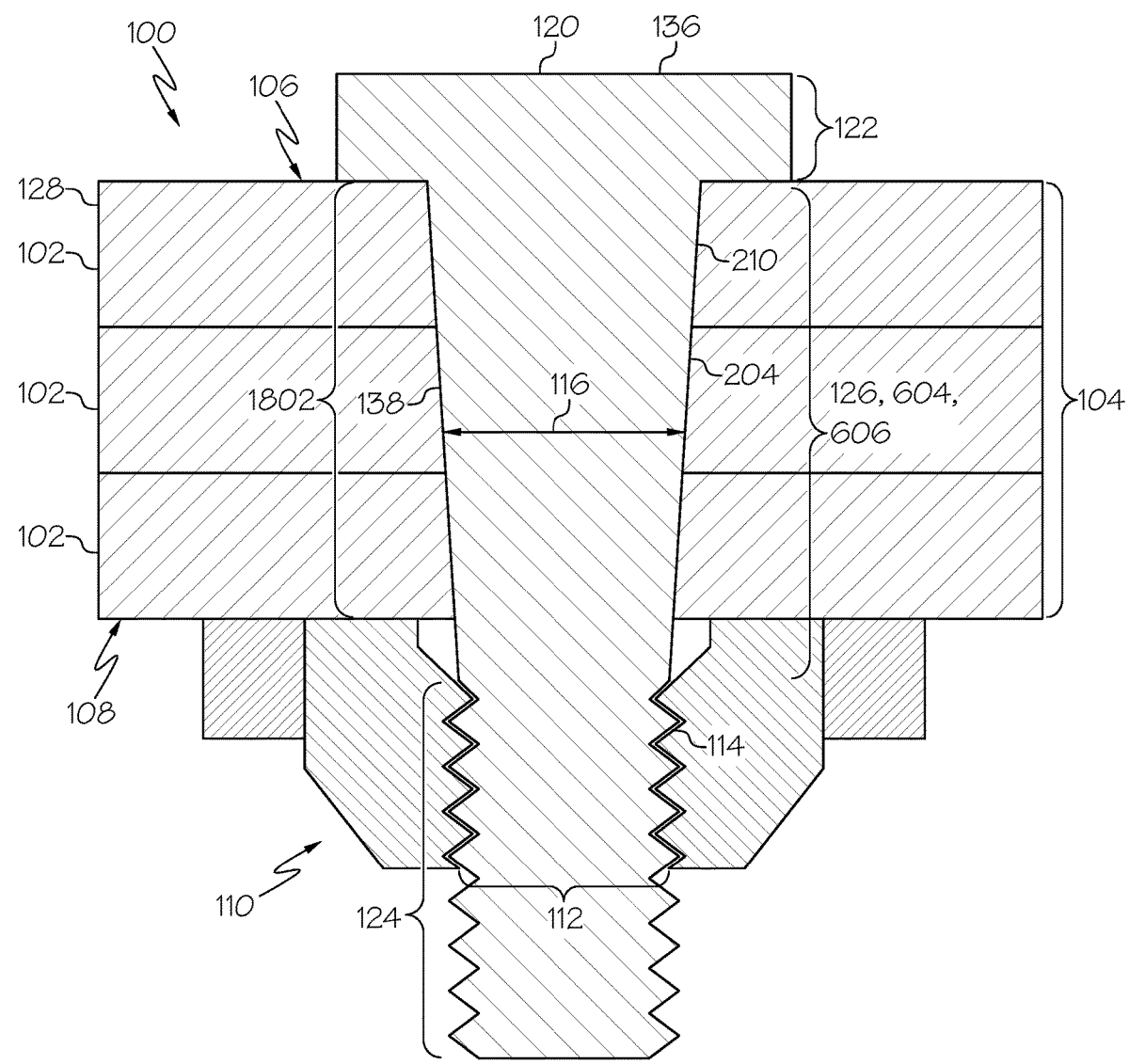
FIG. 18 is a cross-sectional side view of still another example of a fastener system for joining multiple substrates of a workpiece.

Referring generally to FIGS. 1, 2A-B, 3, 4A-C and 18, by way of examples, the present disclosure is directed to a fastener system 100 for joining multiple substrates 102 of a workpiece 104. The workpiece 104 has a working side 106 and a blind side 108. FIGS. 1, 5-7 and 18 disclose examples of the fastener system 100. FIGS. 1 and 18 disclose examples of the fastener system 100. FIG. 2A shows a side view of an example of a sleeve member 118 of the fastener system 100. FIG. 2B shows a distal end view of the sleeve member of FIG. 2A. FIG. 3 shows an example of a nut member 110 of the fastener system 100. FIGS. 4A-C show examples of joining bores 116 in the workpiece 104 of FIG. 1 with a countersunk portion 402, a counterbored portion 404 and a cylindrical portion 406.

With reference again to FIGS. 1, 2A-B, 3, 4A-C and 18, in one or more examples, a fastener system 100 for joining multiple substrates 102 of a workpiece 104 includes a nut member 110 and a bolt member 120. The workpiece 104 has a working side 106 and a blind side 108. The nut member 110 includes a nut bore 112 with internal threads 114. The nut member 110 configured for placement over a joining bore 116 through the multiple substrates 102 on the blind side 108 of the workpiece 104. The joining bore 116 being tapered from a larger joining bore 116 diameter proximate the working side 106 of the workpiece 104 to a smaller joining bore 116 diameter proximate the blind side 108 of the workpiece 104 such that the joining bore 116 includes a frustoconical joining bore 1802. The bolt member 120 includes a head portion 122, a threaded portion 124 and a shank portion 126 extending between the head portion 122 and the threaded portion 124. The shank portion 126 includes an elongated shank body 604 with an outer shank surface 138. The elongated shank body 604 being tapered from a larger outer shank diameter proximate the head portion 122 to a smaller outer shank diameter proximate the threaded portion 124 such that the elongated shank body 604 includes a frustoconical shank body 606. The outer shank surface 138 coated with a lubricious coating 204. The bolt member 120 configured for insertion in the frustoconical joining bore 1802 through the multiple substrates 102 from the working side 106 of the workpiece 104 and configured for threaded engagement with the internal threads 114 of the nut member 110. As the bolt member 120 becomes fully engaged with the nut member 110, the frustoconical shank body 606 is configured to provide an interference fit 1802 within the frustoconical joining bore 1802 through the multiple substrates 102 in conjunction with a corresponding frustoconical shape of the frustoconical joining bore 1802.

In another example of the fastener system 100, the multiple substrates 102 include at least one composite material substrate 128. In yet another example of the fastener system 100, the nut member 110 is configured to be secured to the blind side 108 of the workpiece 104. In a further example, the nut member 110 is configured to be secured to the blind side 108 of the workpiece 104 using mechanical fasteners, swagging or any other suitable fastening hardware/technique in any suitable combination. In still another example of the fastener system 100, the nut member 110 also includes a nut plate assembly 302 with a nut 304 and a flange plate 306 captively retaining the nut 304. The nut 304 includes the nut bore 112. The flange plate 306 configured to be secured to the blind side 108 of the workpiece 104 with the nut bore 112 over the frustoconical joining bore 1802 through the multiple substrates 102.

In still yet another example, the fastener system 100 also includes a cap sealant member 130 with a dome 132 and a cap flange 134. The cap sealant member 130 configured for placement over the nut member 110. The cap flange 134 configured to secure the cap sealant member 130 to the blind side 108 of the workpiece 104. In another example of the fastener system 100, the lubricious coating 204 includes indium, an indium alloy, tin, a tin alloy, bismuth, a bismuth alloy, aluminum, an aluminum alloy or any other suitable lubricious coating in any suitable combination. In yet another example of the fastener system 100, the lubricious coating 204 on the outer shank surface 138 includes conductive features configured to provide electromagnetic energy protection to the workpiece 104 as the bolt member 120 becomes fully engaged with the nut member 110. In still another example of the fastener system 100, the outer shank surface 138 is coated with a conductive coating 210 to provide electromagnetic energy protection to the workpiece 104 as the bolt member 120 becomes fully engaged with the nut member 110. In a further example, the conductive coating 210 includes indium, an indium alloy, tin, a tin alloy, lead, a lead alloy or any other suitable conductive coating in any suitable combination.

In still yet another example of the fastener system 100, the bolt member 120 includes a metallic material. In a further example, the metallic material includes a stainless steel, titanium, a titanium alloy, a cobalt-chromium alloy, a nickel-titanium alloy or any other suitable metallic material in any suitable combination. In another example of the fastener system 100, the head portion 122 of the bolt member 120 includes a torquing feature 136. In a further example, the torquing feature 136 is configured to facilitate rotation of the bolt member 120 using a hex key torquing tool, a cross-tip driver torquing tool, a flat tip driver torquing tool, a hex socket torquing tool or any other suitable torquing tool. In yet another example of the fastener system 100, the head portion 122 of the bolt member 120 includes a protruding head, a flush head, a countersunk head, a raised head, a recessed hexagon socket head, a recessed cross-tip head, a recessed flat tip head, a hexagon head or any other suitable type of head.

In still another example of the fastener system 100, at the working side 106 of the workpiece 104, the frustoconical joining bore 1802 through the multiple substrates 102 includes a countersunk portion 402, a counterbored portion 404, a cylindrical portion 406 or any other suitable geometry at the working side 106 compatible with the head portion 122 of the bolt member 120. In still yet another example of the fastener system 100, outer shank diameters for the frustoconical shank body 606 are substantially greater than corresponding frustoconical joining bore 1802 diameters that define the frustoconical joining bore 1802. In a further example, the outer shank diameters are substantially greater than the corresponding frustoconical joining bore (1802) diameters by approximately 0.0005 inches, approximately 0.0010 inches, approximately 0.0015 inches, approximately 0.0020 inches, approximately 0.0025 inches or any other suitable difference measurement resulting the interference fit 1802 within the frustoconical joining bore 1802. In another example of the fastener system 100, the outer shank diameters are substantially greater than the corresponding frustoconical joining bore 1802 diameters by approximately 0.2 percent, approximately 0.4 percent, approximately 0.6 percent, approximately 0.8 percent, approximately 1.0 percent or any other suitable percentage resulting the interference fit 1802 within the frustoconical joining bore 1802.

Figure 19:
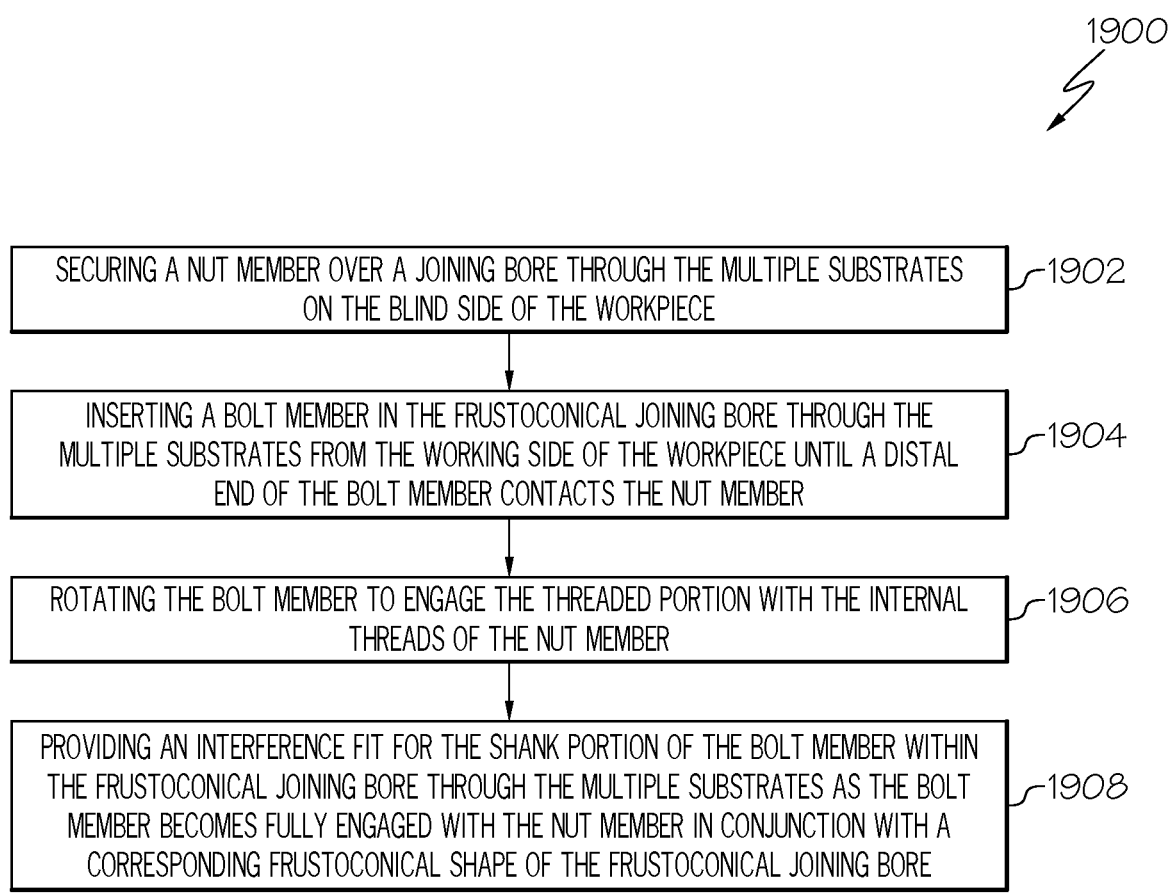
FIG. 19 is a flow diagram of still yet another example of a method for joining multiple substrates of a workpiece.
Figure 20:
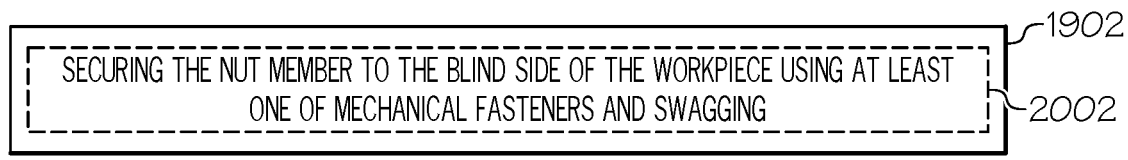
FIG. 20 is a flow diagram showing a further example of "securing a nut member" from the method of FIG. 19.
Figure 21:
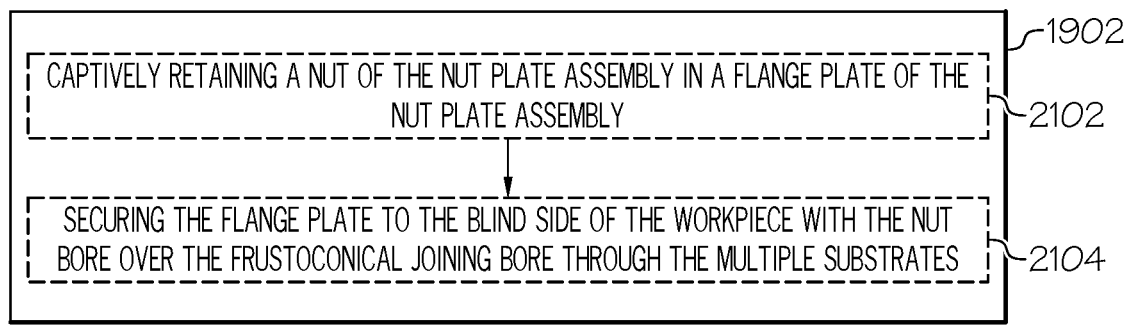
FIG. 21 is a flow diagram showing another further example of "securing a nut member" from the method of FIG. 19.
Figure 22:
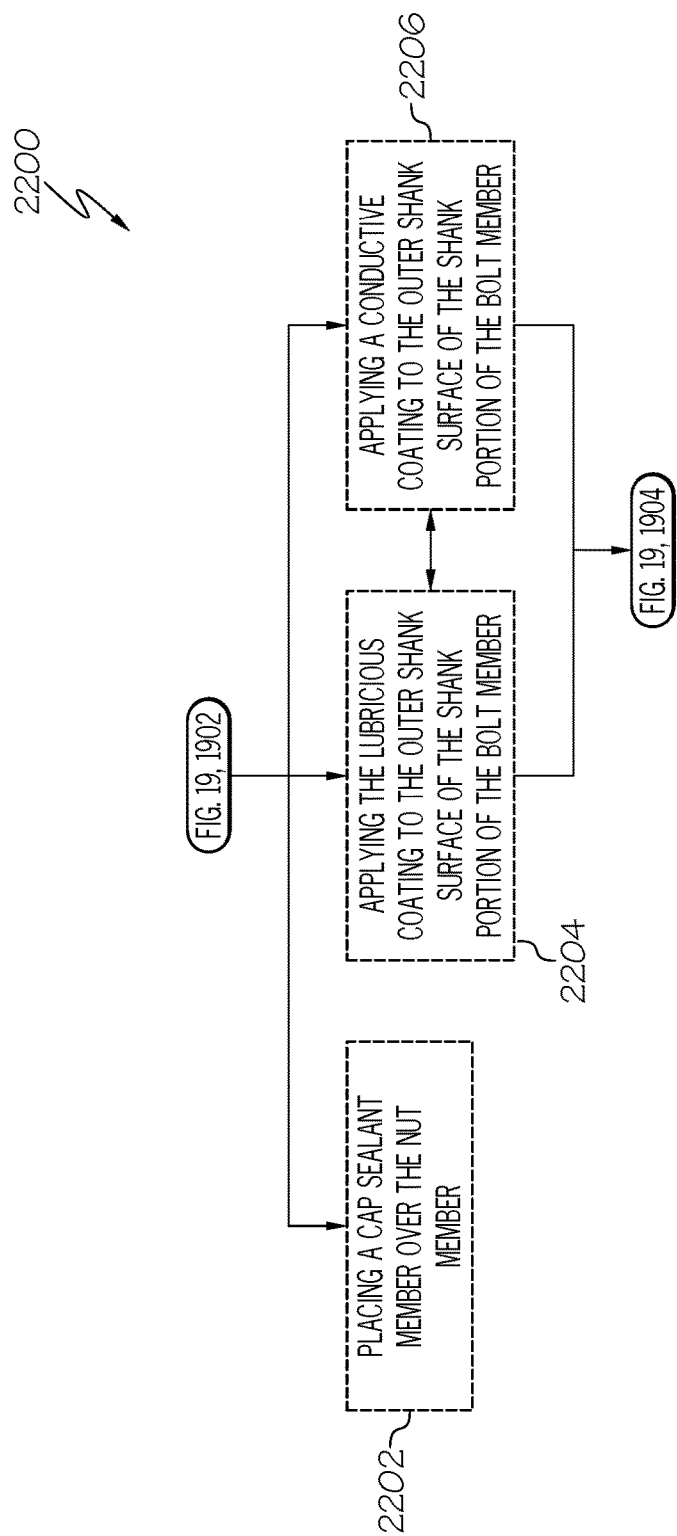
FIG. 22, in combination with FIG. 19, is a flow diagram of another example of a method for joining multiple substrates of a workpiece.
Figure 23:
FIG. 23 is a flow diagram showing a further example of "rotating the bolt member" from the method of FIG. 19.

Referring generally to FIGS. 1, 2A-B, 3, 4A-C and 18-23, by way of examples, the present disclosure is directed to methods 1900, 2200 for joining multiple substrates 102 of a workpiece 104. The workpiece 104 has a working side 106 and a blind side 108. FIGS. 1 and 18 disclose examples of the fastener system 100. FIG. 2A shows a side view of an example of a sleeve member 118 of the fastener system 100. FIG. 2B shows a distal end view of the sleeve member of FIG. 2A. FIG. 3 shows an example of a nut member 110 of the fastener system 100. FIGS. 4A-C show examples of joining bores 116 in the workpiece 104 of FIG. 1 with a countersunk portion 402, a counterbored portion 404 and a cylindrical portion 406. FIGS. 19-21 and 23 disclose various examples of the method 1900. FIGS. 19 and 22 disclose various examples of the method 2200.

With reference again to FIGS. 1, 2A-B, 3, 4A-C, 18-21 and 23, in one or more examples, a method 1900 (see FIG. 19) for joining multiple substrates 102 of a workpiece 104 with a working side 106 and a blind side 108 includes securing 1902 a nut member 110 over a joining bore 116 through the multiple substrates 102 on the blind side 108 of the workpiece 104. The nut member 110 includes a nut bore 112 with internal threads 114. The joining bore 116 being tapered from a larger joining bore 116 diameter proximate the working side 106 of the workpiece 104 to a smaller joining bore 116 diameter proximate the blind side 108 of the workpiece 104 such that the joining bore 116 includes a frustoconical joining bore 1802. At 1904, a bolt member 120 is inserted in the frustoconical joining bore 1802 through the multiple substrates 102 from the working side 106 of the workpiece 104 until a distal end of the bolt member 120 contacts the nut member 110. The bolt member 120 includes a head portion 122 at a proximal end, a threaded portion 124 at the distal end and a shank portion 126 extending between the head portion 122 and the threaded portion 124. The shank portion 126 being tapered from a larger outer shank diameter proximate the head portion 122 to a smaller outer shank diameter proximate the threaded portion 124 such that the shank portion 126 includes a frustoconical shank body 606. The shank portion 126 includes an outer shank surface 138 with a lubricious coating 204. At 1906, the bolt member 120 is rotated to engage the threaded portion 124 with the internal threads 114 of the nut member 110. At 1908, an interference fit 1802 is provided for the shank portion 126 of the bolt member 120 within the frustoconical joining bore 1802 through the multiple substrates 102 as the bolt member 120 becomes fully engaged with the nut member 110 in conjunction with a corresponding frustoconical shape of the frustoconical joining bore 1802.

In another example of the method 1900, the securing 1902 the nut member 110 includes securing 2002 (see FIG. 20) the nut member 110 to the blind side 108 of the workpiece 104 using mechanical fasteners, swagging or any other suitable fastening hardware/technique in any suitable combination.

In yet another example of the method 1900, the nut member 110 includes a nut plate assembly 302. In this example, the securing 1902 the nut member 110 includes captively retaining 2102 (see FIG. 21) a nut 304 of the nut plate assembly 302 in a flange plate 306 of the nut plate assembly 302. At 2104, the flange plate 306 is secured to the blind side 108 of the workpiece 104 with the nut bore 112 over the frustoconical joining bore 1802 through the multiple substrates 102.

With reference again to FIGS. 1, 2A-B, 19 and 22, in one or more examples, a method 2200 (see FIG. 22) for joining multiple substrates 102 of a workpiece 104 includes the method 1900 of FIG. 19 and continues from 1902 to 2202 where a cap sealant member 130 is placed over the nut member 110. The cap sealant member 130 including a dome 132 and a cap flange 134. The cap flange 134 configured to secure the cap sealant member 130 to the blind side 108 of the workpiece 104. In another example, the method 2200 continues from 1902 to 2204 where the lubricious coating 204 is applied to the outer shank surface 138 of the shank portion 126 of the bolt member 120. In yet another example of the method 2200, the lubricious coating 204 on the outer shank surface 138 includes conductive features configured to provide electromagnetic energy protection to the workpiece 104 as the bolt member 120 becomes fully engaged with the nut member 110. In still another example, the method 2200 continues from 1902 to 2206 where a conductive coating 210 is applied to the outer shank surface 138 of the shank portion 126 of the bolt member 120.

With reference again to FIGS. 1, 18-21 and 23, in another example of the method 1900, the rotating 1906 the bolt member 120 includes torquing 2302 the bolt member 120 to become fully engaged with the nut member 110. In yet another example of the method 1900 outer shank diameters for the frustoconical shank body 606 are substantially greater than corresponding frustoconical joining bore 1802 diameters that define the frustoconical joining bore 1802.

Examples of fastener systems 100 and methods 800, 1100, 1400, 1900, 2200 for joining multiple substrates of a workpiece may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of composite products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc., are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 2A-B, 3, 4A-C, 5-7 and 18, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1, 2A-B, 3, 4A-C, 5-7 and 18, referred to above, need be included in every example and not all elements, features and/or components described herein are necessarily depicted in each illustrative example. Accordingly, some of the elements, features and/or components described and illustrated in FIGS. 1, 2A-B, 3, 4A-C, 5-7 and 18 may be combined in various ways without the need to include other features described and illustrated in FIGS. 1, 2A-B, 3, 4A-C, 5-7 and 18, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1, 2A-B, 3, 4A-C, 5-7 and 18, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1, 2A-B, 3, 4A-C, 5-7 and 18 and such elements, features and/or components may not be discussed in detail herein with reference to each of FIGS. 1, 2A-B, 3, 4A-C, 5-7 and 18. Similarly, all elements, features and/or components may not be labeled in each of FIGS. 1, 2A-B, 3, 4A-C, 5-7 and 18, but reference numerals associated therewith may be utilized herein for consistency.

In FIGS. 8-17 and 19-23, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 8-17 and 19-23 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 24:
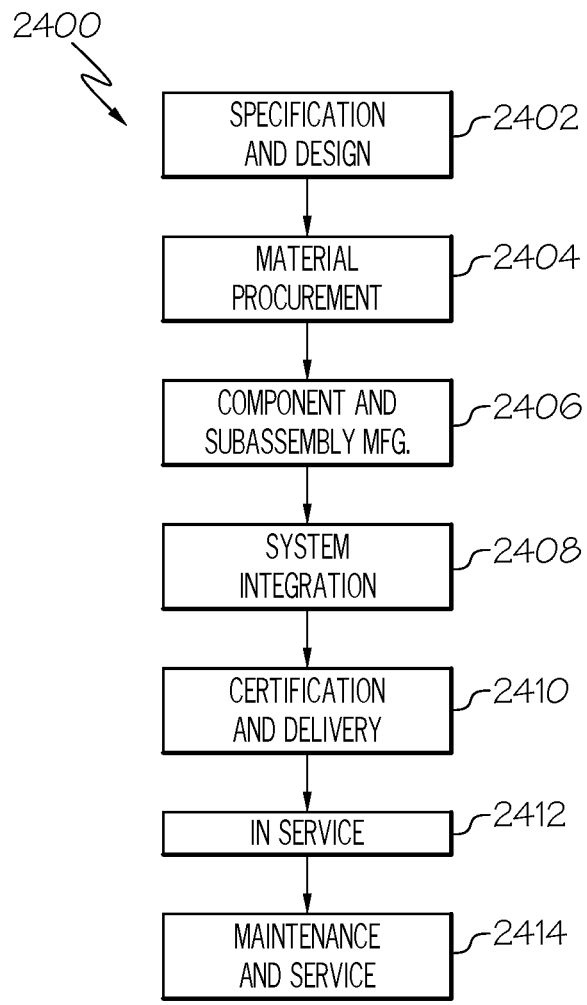
FIG. 24 is a block diagram of aircraft production and service methodology that implements one or more of the examples of methods for joining multiple substrates of a workpiece disclosed herein.
Figure 25:
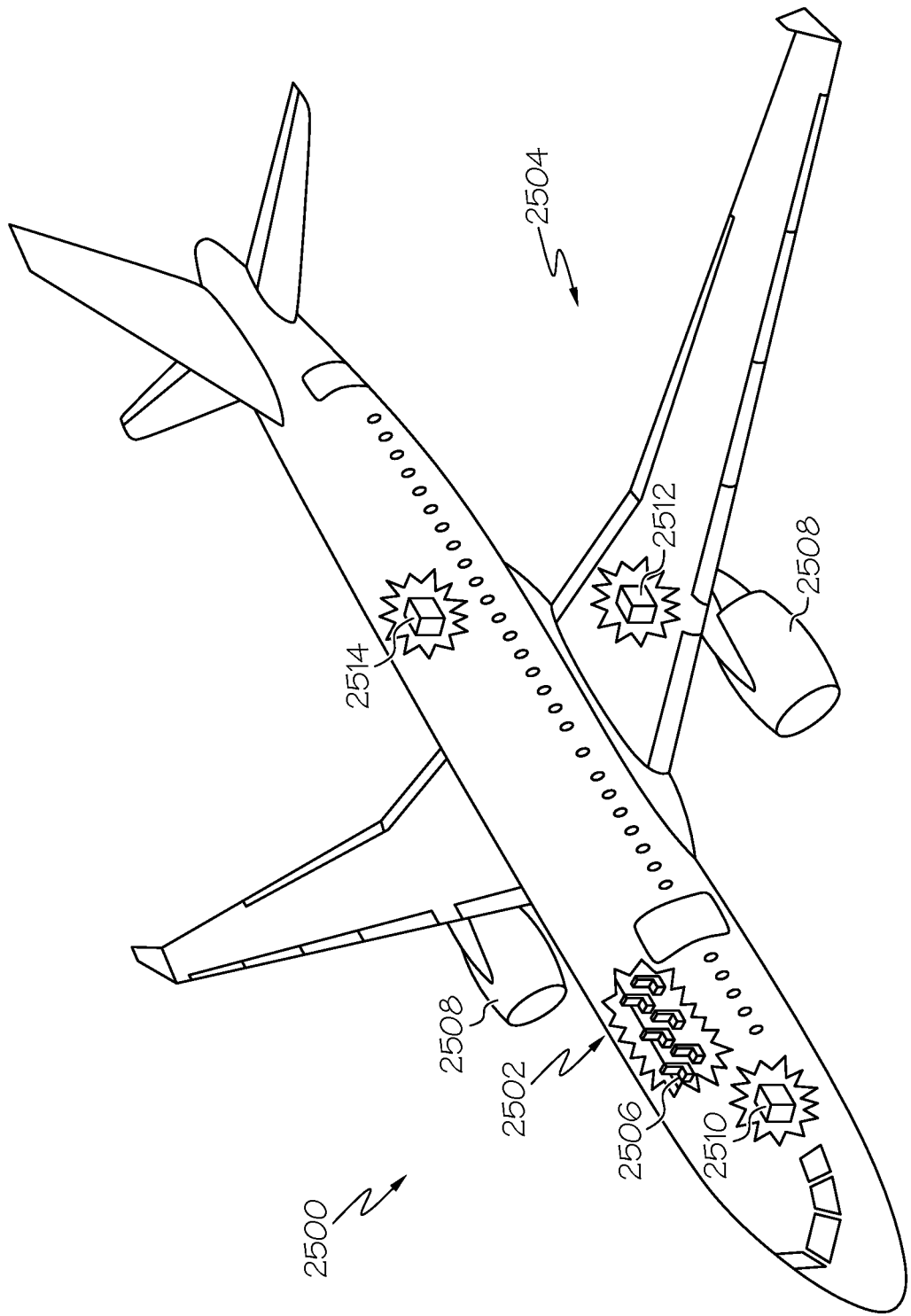
FIG. 25 is a schematic illustration of an aircraft that incorporates workpieces with multiple substrates that are joined using one or more of the examples of fastener systems and methods for joining multiple substrates of a workpiece disclosed herein.

Examples of the subject matter disclosed herein may be described in the context of aircraft manufacturing and service method 2400 as shown in FIG. 24 and aircraft 2500 as shown in FIG. 25. In one or more examples, the disclosed methods and systems for associating test data for a part under test with an end item coordinate system may be used in aircraft manufacturing. During pre-production, the service method 2400 may include specification and design (block 2402) of aircraft 2500 and material procurement (block 2404). During production, component and subassembly manufacturing (block 2406) and system integration (block 2408) of aircraft 2500 may take place. Thereafter, aircraft 2500 may go through certification and delivery (block 2410) to be placed in service (block 2412). While in service, aircraft 2500 may be scheduled for routine maintenance and service (block 2414). Routine maintenance and service may include modification, reconfiguration, refurbishment, etc. of one or more systems of aircraft 2500.

Each of the processes of the service method 2400 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 25, aircraft 2500 produced by the service method 2400 may include airframe 2502 with a plurality of high-level systems 2504 and interior 2506. Examples of high-level systems 2504 include one or more of propulsion system 2508, electrical system 2510, hydraulic system 2512 and environmental system 2514. Any number of other systems may be included. Although an aerospace example is shown, the principles disclosed herein may be applied to other industries, such as the automotive industry. Accordingly, in addition to aircraft 2500, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 2400. For example, components or subassemblies corresponding to component and subassembly manufacturing (block 2406) may be fabricated or manufactured in a manner similar to components or subassemblies produced while aircraft 2500 is in service (block 2412). Also, one or more examples of the system(s), method(s), or combination thereof may be utilized during production stages (block 2406 and block 2408), for example, by substantially expediting assembly of or reducing the cost of aircraft 2500. Similarly, one or more examples of the system or method realizations, or a combination thereof, may be utilized, for example and without limitation, while aircraft 2500 is in service (block 2412) and/or during maintenance and service (block 2414).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the fastener systems 100 and methods 800, 1100, 1400, 1900, 2200 for joining multiple substrates of a workpiece have been shown and described, modifications may occur to those skilled in the art upon reading the specification. The present application includes such modifications and is limited only by the scope of the claims.

What is claimed is:

1. A fastener system for joining multiple substrates of a workpiece, the workpiece having a working side and a blind side, the fastener system comprising:
    a nut member comprising a nut bore with internal threads, the nut member configured for placement of the nut bore over a joining bore through the multiple substrates on the blind side of the workpiece;
    a radially continuous sleeve member formed from a malleable metallic material, the sleeve member comprising an outer sleeve surface with a conductive lubricious coating, the sleeve member configured for insertion in the joining bore through the multiple substrates from the working side of the workpiece; and
    a bolt member comprising a head portion, a threaded portion and a shank portion extending between the head portion and the threaded portion, the bolt member configured for insertion in a central bore of the sleeve member, the threaded portion configured for threaded engagement with the internal threads of the nut member, wherein, as the bolt member becomes fully engaged with the nut member, the shank portion of the bolt member is configured to cause radial expansion of the sleeve member and the sleeve member is configured to provide an interference fit within the joining bore through the multiple substrates.

2. The fastener system of claim 1, the nut member further comprising:
a nut plate assembly comprising a nut and a flange plate captively retaining the nut, the nut comprising the nut bore, the flange plate configured to be secured to the blind side of the workpiece with the nut bore over the joining bore through the multiple substrates.

3. The fastener system of claim 2 wherein the nut captively retained by the flange plate is spaced from a mounting surface of the flange plate, the flange plate comprising:
a counterbore into the mounting surface in relative alignment with the nut bore of the nut and the joining bore of the multiple substrates, the counterbore configured to provide space for a distal end of the sleeve member protruding from the joining bore at the blind side of the workpiece as the bolt member becomes fully engaged with the nut member.

4. The fastener system of claim 1, the sleeve member further comprising an inner sleeve surface and the shank portion of the bolt member comprising an outer shank surface, wherein at least one of the inner sleeve surface and the outer shank surface is coated with the lubricious coating.

5. The fastener system of claim 1, the sleeve member further comprising:
a cylindrical sleeve body defining the central bore, the cylindrical sleeve body comprising the outer sleeve surface, an inner sleeve surface facing the central bore, a proximal end relating to the working side of the workpiece and a distal end relating to the blind side of the workpiece.

6. The fastener system of claim 5, the shank portion of the bolt member comprising:
a cylindrical shank body comprising an outer shank surface configured to face the inner sleeve surface of the cylindrical sleeve body as the bolt member is inserted into the central bore and becomes engaged with the nut member.

7. The fastener system of claim 6 wherein an outer shank diameter for the cylindrical shank body is substantially greater than an inner sleeve diameter for the cylindrical sleeve body.

8. The fastener system of claim 1, the sleeve member further comprising:
an elongated sleeve body defining the central bore, the elongated sleeve body comprising the outer sleeve surface, an inner sleeve surface facing the central bore, a proximal end relating to the working side of the workpiece and a distal end relating to the blind side of the workpiece,
wherein at least the inner sleeve surface is tapered from a larger inner sleeve diameter proximate the proximal end to a smaller inner sleeve diameter proximate the distal end such that the central bore comprises a frustoconical sleeve bore.

9. The fastener system of claim 8 wherein the outer sleeve surface is cylindrical such that the elongated sleeve body comprises a cylindrical sleeve body with the frustoconical sleeve bore.

10. The fastener system of claim 9, the shank portion of the bolt member comprising:
an elongated shank body with an outer shank surface configured to face the inner sleeve surface as the bolt member is inserted into the frustoconical sleeve bore and becomes engaged with the nut member,
wherein the elongated shank body is tapered from a larger outer shank diameter proximate the head portion of the bolt member to a smaller outer shank diameter proximate the threaded portion of the bolt member such that the elongated shank body comprises a frustoconical shank body.

11. The fastener system of claim 10 wherein outer shank diameters for the frustoconical shank body are substantially greater than corresponding inner sleeve diameters that define the frustoconical sleeve bore.

12. The fastener system of claim 8 wherein the outer sleeve surface is tapered from a larger outer sleeve diameter proximate the proximal end to a smaller outer sleeve diameter proximate the distal end such that the elongated sleeve body comprises a frustoconical sleeve body.

13. The fastener system of claim 12, the shank portion of the bolt member comprising:
an elongated shank body with an outer shank surface configured to face the inner sleeve surface as the bolt member is inserted into the frustoconical sleeve bore and becomes engaged with the nut member,
wherein the elongated shank body is tapered from a larger outer shank diameter proximate the head portion of the bolt member to a smaller outer shank diameter proximate the threaded portion of the bolt member such that the elongated shank body comprises a frustoconical shank body.

14. The fastener system of claim 13 wherein outer shank diameters for the frustoconical shank body are substantially greater than corresponding inner sleeve diameters that define the frustoconical sleeve bore.

15. The fastener system of claim 1, wherein the malleable metallic material comprises at least one of tin, a tin alloy, copper, a copper alloy, aluminum, an aluminum alloy, silver, a silver alloy, gold and a gold alloy.

16. The fastener system of claim 1, wherein the lubricious coating comprises at least one of indium, an indium alloy, tin, a tin alloy, bismuth, a bismuth alloy, aluminum and an aluminum alloy.

17. A method for joining multiple substrates of a workpiece using the fastener system of claim 1, the workpiece having a working side and a blind side, the method comprising:
securing the nut member over the joining bore through the multiple substrates on the blind side of the workpiece;
inserting the sleeve member in the joining bore through the multiple substrates from the working side of the workpiece;
inserting the bolt member in the central bore of the sleeve member until a distal end of the bolt member contacts the nut member;
rotating the bolt member to engage the threaded portion with the internal threads of the nut member;
radially expanding the sleeve member within the joining bore through the multiple substrates as the bolt member becomes fully engaged with the nut member; and
providing the interference fit for the sleeve member within the joining bore through the multiple substrates in response to radial expansion of the sleeve member as the bolt member becomes fully engaged with the nut member.

18. A blind fastener system comprising:
a plurality of substrates having a working side, a blind side, and a joining bore extending from the working side to the blind side;
a nut member secured to the blind side of the plurality of substrates, the nut member comprising a nut bore with internal threads aligned with the joining bore;
a sleeve member configured for insertion within the joining bore, the sleeve member comprising an outer sleeve surface with a conductive lubricious coating; and
a bolt member configured for insertion through the sleeve member, the bolt member comprising a head portion, a shank portion, and a threaded portion, the threaded portion configured for engagement with the internal threads of the nut member,
wherein, as the bolt member becomes fully engaged with the nut member, the shank portion of the bolt member is configured to cause radial expansion of the sleeve member, and the sleeve member is configured to provide an interference fit within the joining bore through the plurality of substrates.

19. The blind fastener system of claim 18, where the nut member further comprises:
a nut plate assembly comprising a nut and a flange plate captively retaining the nut, the nut comprising the nut bore, the flange plate configured to be secured to the blind side of the workpiece with the nut bore over the joining bore through the multiple substrates.

20. The blind fastener system of claim 18, wherein the sleeve member is a radially continuous sleeve member.

* * * * *